(12) United States Patent
Putnam

(10) Patent No.: US 6,357,967 B1
(45) Date of Patent: Mar. 19, 2002

(54) APPARATUS FOR BURSTING AND REPLACING PIPE

(76) Inventor: Samuel W. Putnam, 305 Darbonne Dr., West Monroe, LA (US) 71291

( * ) Notice: Subject to any disclaimer, the term of this patent is extended or adjusted under 35 U.S.C. 154(b) by 0 days.

(21) Appl. No.: 09/562,082

(22) Filed: May 1, 2000

(51) Int. Cl.[7] .............................................. F16L 1/028
(52) U.S. Cl. ............................... 405/184.3; 405/184.1; 405/156; 405/184; 254/29 R
(58) Field of Search ................................ 405/154, 156, 405/183.5, 184, 184.1, 184.3; 254/29 R

(56) References Cited

U.S. PATENT DOCUMENTS

| | | | |
|---|---|---|---|
| 2,044,483 A | 2/1936 | Neher ........................... 254/29 |
| 2,126,933 A | 8/1938 | Stone ............................. 255/1 |
| 2,889,135 A | 6/1959 | Tennyck ....................... 254/29 |
| 2,939,739 A | 6/1960 | Grunsky ....................... 294/96 |
| 3,094,312 A | 6/1963 | Woolgar ....................... 254/29 |
| 3,266,776 A | 8/1966 | Catu ............................ 254/135 |
| 3,787,950 A | 1/1974 | Bagby ........................... 29/237 |
| 3,834,668 A | 9/1974 | Casey ........................... 254/29 |
| 3,998,428 A | 12/1976 | Miles ........................... 254/29 |
| 4,030,183 A | 6/1977 | Smola ........................... 29/252 |
| 4,448,393 A | 5/1984 | Habegger et al. ........... 254/264 |
| 4,456,226 A | 6/1984 | Stumpmeier ................ 254/264 |
| 4,571,802 A | 2/1986 | Calhoun et al. ............ 29/157.3 |
| 4,593,884 A | 6/1986 | Zschocke et al. .......... 254/264 |
| 4,615,509 A | 10/1986 | Biass .......................... 254/264 |
| 4,634,101 A | 1/1987 | Lauber ....................... 254/228 |
| 4,634,313 A * | 1/1987 | Robbins ...................... 405/184 |
| 4,648,746 A | 3/1987 | Abinett ....................... 405/184 |
| 4,693,404 A | 9/1987 | Wayman et al. ............. 225/103 |
| 4,732,222 A | 3/1988 | Schmidt ....................... 175/22 |
| 4,738,565 A | 4/1988 | Streatfield et al. .......... 405/154 |
| 5,013,188 A | 5/1991 | Campbell et al. ........... 405/184 |
| 5,112,070 A | 5/1992 | Hahn ........................... 280/79.4 |
| 5,127,481 A | 7/1992 | Hesse ........................... 175/295 |
| 5,171,106 A | 12/1992 | Rockower et al. .......... 405/156 |
| 5,173,009 A * | 12/1992 | Moriarty ..................... 405/154 |
| 5,205,671 A * | 4/1993 | Handford .................... 405/184 |
| 5,207,533 A | 5/1993 | Federspiel et al. .......... 405/156 |
| 5,208,967 A | 5/1993 | Beard ........................... 29/726 |
| 5,277,406 A | 1/1994 | Knight ........................ 254/228 |
| 5,302,053 A * | 4/1994 | Moriarty ..................... 405/184 |
| 5,306,101 A | 4/1994 | Bockower et al. .......... 405/154 |
| 5,482,404 A | 1/1996 | Tenbusch, II ............... 405/184 |
| 5,580,188 A | 12/1996 | Nowak ........................ 405/184 |

(List continued on next page.)

Primary Examiner—Thomas B. Will
Assistant Examiner—Alexandra K. Pechhold
(74) Attorney, Agent, or Firm—John M. Harrison

(57) ABSTRACT

An apparatus for bursting and replacing gas, water, sewer or other underground utility pipes. In a preferred embodiment the apparatus is characterized by a specially-designed rod-pulling device which is situated typically in a manhole or excavation, at one end of the pipe to be replaced. A rod is extended from the rod-pulling device through the pipe and is attached to a stored energy head disposed in a tapered bursting head which initially engages the opposite end of the pipe. A pneumatic hammer is typically seated in the stored energy head and a replacement pipe is removably attached to the bursting head. In typical operation, the rod-pulling device pus the stored energy head against the bursting head and thus, the bursting head against the pipe as the pneumatic hammer repeatedly strikes the stored energy head against the bursting head. The combined actions of the rod-pulling device and hammer cause the bursting head to progressively rupture the old pipe and draw the replacement pipe into position as the bursting head migrates along the pipe. A pair of springs fitted in the stored energy head biases the stored energy head against the bursting head as the rod pulls against the stored energy head. When the hammer strikes the stored energy head against the bursting head, tension released by the springs augments the driving action of the hammer and assists the rod-pulling device and hater in forcing the bursting head along the pipe.

28 Claims, 14 Drawing Sheets

U.S. PATENT DOCUMENTS

| | | |
|---|---|---|
| 5,749,677 A | 5/1998 | Grigoraschenko et al. .. 405/184 |
| 5,782,311 A * | 7/1998 | Wentworth ................. 405/184 |
| 5,785,458 A * | 7/1998 | Handfofrd ................. 405/184 |
| 6,092,553 A * | 7/2000 | Hodgson ................... 405/154 |
| 6,129,486 A * | 10/2000 | Putnam ..................... 405/184 |
| 6,244,783 B1 * | 6/2001 | Puttmann et al. ........... 405/184 |

\* cited by examiner

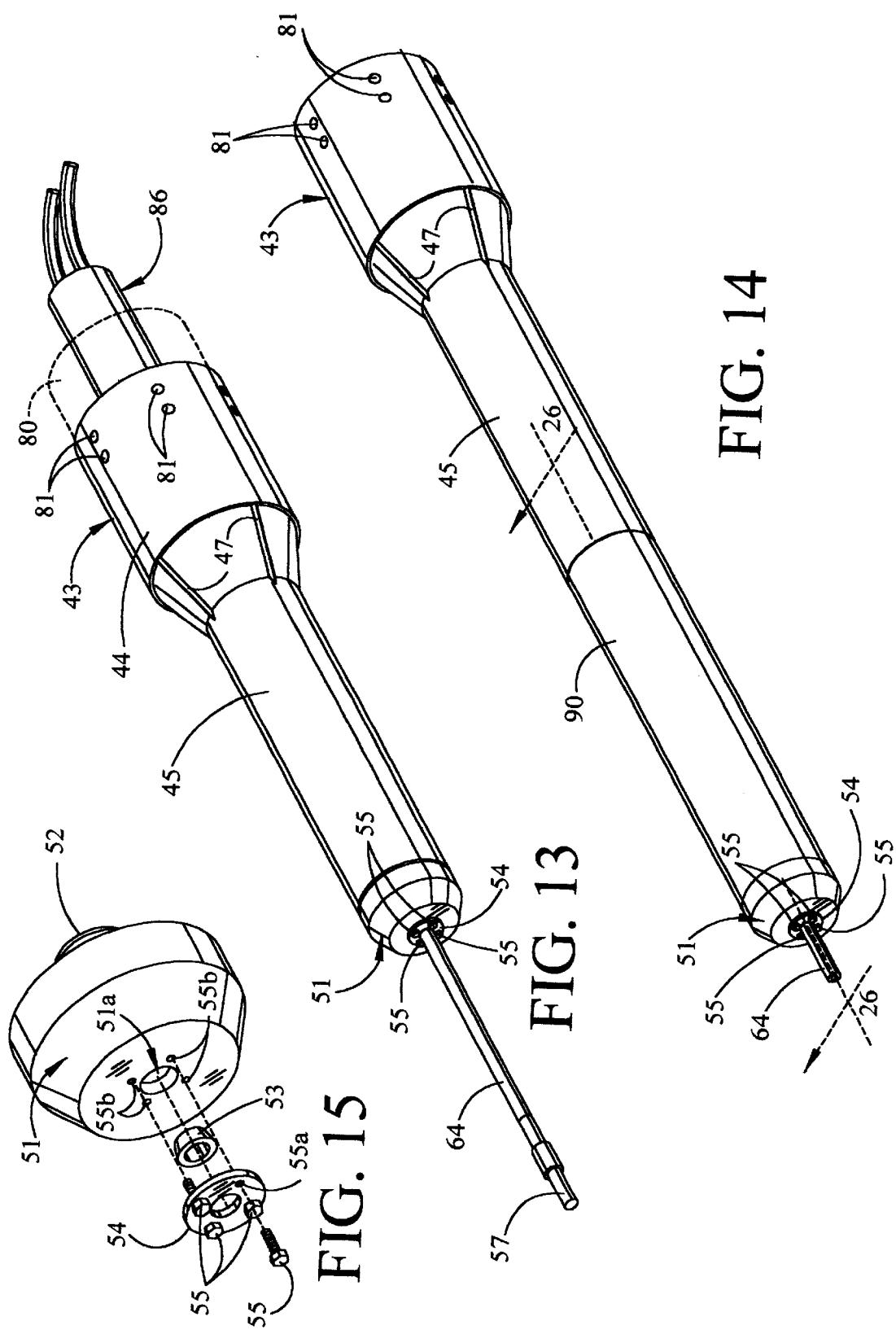

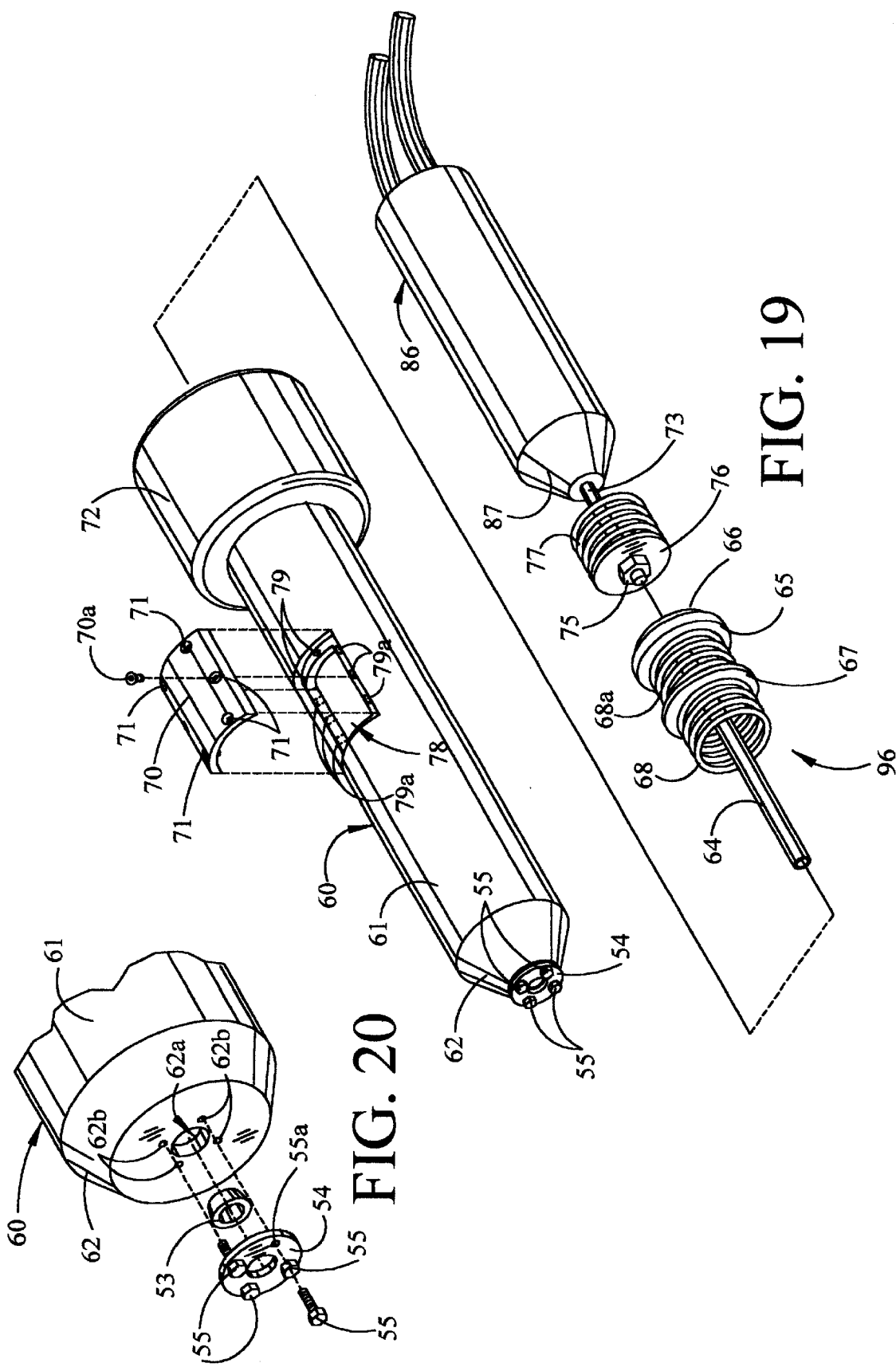

APPARATUS FOR BURSTING AND REPLACING PIPE

CROSS-REFERENCE TO RELATED APPLICATIONS

This application is related to my application Ser. No. 09/126,038, filed Jul. 29, 1998 now U.S. Pat. No. 6,129,486.

BACKGROUND OF THE INVENTION

1. Field of the Invention

This invention relates to devices for simultaneously destroying and replacing buried pipes and more particularly, to an apparatus for progressively bursting a gas, water, sewer or other underground utility pipe and simultaneously drawing a replacement pipe into position behind the migrating burst point of the pipe being replaced. In a preferred embodiment the apparatus is characterized by a specially-designed rod-pulling device which is typically fitted with a pair of in-line double-action hydraulic rod-driving members and situated in a manhole or excavation, at one end of the pipe to be replaced. A rod is extended from the rod-driving members of the rod-pulling device, through the pipe and is attached to a stored energy head disposed in a typically conventional, tapered bursting head typically fitted with multiple blades which initially engage the opposite end of the pipe, and a replacement pipe is removably attached to the bursting head. Under circumstances in which valves, concrete encasement, timbers or other obstructions are likely to be encountered by the bursting head in the pipe, a pneumatic hammer is typically spring-biased against the stored energy head. In typical operation, the rod-driving members of the rod-pulling device alternately and repeatedly grip, pull and release the rod and move to a new grip position on the rod, to continually draw the rod through the rod-pulling device. The rod pulls the stored energy head against the bursting head and thus, the bursting head against the pipe to be replaced as the pneumatic hammer is typically operated to repeatedly strike the stored energy head against the bursting head. The combined pulling action of the rod-pulling device and driving action of the hammer cause the bursting head to progressively cut and rupture the old pipe along the length thereof and break through any obstructions in the pipe, and simultaneously draw the replacement pipe into position behind the migrating burst point of the old pipe. A pair of springs fitted in the stored energy head is compressed and biases the stored energy head against the bursting head as the rod pulls against the stored energy head. As the hammer strikes the stored energy head against the bursting head, tension released by the springs augments the driving action of the hammer and assists the rod-pulling device and hammer in forcing the bursting head along the pipe. When obstructions are unlikely to be encountered by the bursting head, the rod-pull device can be used without the pneumatic hammer to pull the bursting head along the pipe.

2. Description of the Prior Art

Underground water, gas, sewer and other utility pipes typically require replacement after an extended period of use, frequently due to corrosion or damage to the pipes. Usually, digging trenches to expose the damaged pipes for replacement is undesirable since this frequently requires destruction of streets, sidewalks, parking lots or lawns, which is unsightly and expensive. To avoid these problems, various techniques and apparatuses have been devised to destroy the pipe in need of replacement and draw a new pipe into place without having to excavate trenches for the operation. Generally, the techniques involve excavating the ground at both ends of the pipe to be replaced and positioning a hydraulic pulling device of selected design in one of the excavations and a cutting tool at the opposite end of the pipe in the other excavation. A rod or cable is extended from the pulling device, through the pipe and attached to the cutting tool at the opposite end of the pipe. As the hydraulic pulling device is operated to pull the cutting tool against the pipe, a pneumatic hammer typically repeatedly strikes the cutting tool against the pipe, and the combined pulling action of the pulling device and stag action of the hammer on the cutting tool causes the tool to migrate and progressively cut and burst the pipe along the entire length of the pipe. A replacement pipe is typically attached to the cutting tool such that the replacement pipe is drawn into position behind the cutting tool as the cutting tool bursts the old pipe.

Many devices are known in the art for bursting an underground pipe and drawing a replacement pipe into position behind the bursted pipe. Some of these devices are detailed in U.S. Pat. No. 4,648,746; U.S. Pat. No. 4,693,404; U.S. Pat. No. 4,732,222; U.S. Pat. No. 4,738,565; U.S. Pat. No. 5,013,188; U.S. Pat. No. 5,127,481; U.S. Pat. No. 5,171,106; U.S. Pat. No. 5,207,533; U.S. Pat. No. 5,306,101; U.S. Pat. No. 5,482,404; U.S. Pat. No. 5,580,188; U.S. Pat. No. 5,749,677; and U.S. Pat. No. 5,782,311.

Various devices for pulling a cable or rod against a resistance are known in the art. Some of these devices are detailed in U.S. Pat. No. 3,266,776; U.S. Pat. No. 4,448,393; 4,456,226; U.S. Pat. No. 4,593,884; U.S. Pat. No. 4,615,509; U.S. Pat. No. 4,634,101; and U.S. Pat. No. 5,277,406. Other patents of interest include U.S. Pat. No. 2,044,483; U.S. Pat. No. 2,126,933; U.S. Pat. No. 2,889,135; U.S. Pat. No. 2,939,739; U.S. Pat. No. 3,094,312; U.S. Pat. No. 3,787,950; U.S. Pat. No. 3,834,668; U.S. Pat. No. 3,998,428; U.S. Pat. No. 4,030,183; U.S. Pat. No. 4,571,802; U.S. Pat. No. 5,112,070; and U.S. Pat. No. 5,208,967, An object of this invention is to provide a new and improved apparatus for bursting and replacing underground pipes.

Another object of this invention is to provide a new and improved apparatus for quickly and effectively bursting and replacing a water, gas, sewer or other underground utility pipe without requiring digging of trenches to expose the pipe.

Still another object of this invention is to provide a pipe bursting and replacement apparatus including a typically conventional pipe-bursting head for progressively bursting an underground pipe to be replaced; a specially-designed hydraulic rod-pulling device which pulls the pipe bursting head along the pipe; and a typically conventional pneumatic hammer which simultaneously drives the pipe bursting head along the bursting pipe, particularly under circumstances in which significant obstructions are encountered by the bursting head in the pipe, and wherein a replacement pipe is typically removably attached to the bursting head and drawn into position behind the migrating burst point of the pipe being replaced.

Yet another object of this invention is to provide a new and improved apparatus for bursting and replacing underground utility pipes, which apparatus includes a rod or cable pulling device of selected design situated in a manhole or excavation adjacent to one end of a pipe to be replaced; a typically conventional pipe bursting head initially engage the opposite end of the pipe; a pull rod or cable extending from the rod or cable pulling device and through the pipe to be replaced, and attached to a stored energy head disposed in the pipe bursting head; a spring or springs fitted in the stored energy head for biasing the stored energy head against the pipe bursting head as the rod or cable pulling device pull the stored energy head against the bursting head and thus, the bursting head against the pipe; and a typically conventional pneumatic hammer engaging the stored energy head for repeatedly striking the stored energy head against the pipe bursting head as the rod-driving members alternately and repeatedly grip and pull the pull rod and the attached stored energy head against the bursting head and thus, the bursting head against the pipe, whereby tension released by the springs augments the driving effect of the hammer and assists the rod-pulling device and Her in forcing the bursting head along the pipe as the hammer repeatedly strikes the stored energy head against the bursting head and forces the bursting head though valves, concrete encasement, timbers and other obstructions in and around the pipe.

A still further object of this invention is to provide a hydraulic pulling device for pulling a bursting head along an underground utility pipe, characterized by a pair of in-line, double-action hydraulic rod-driving members mounted on a frame, which rod-driving members are fitted with respective rod-gripping elements which alternately and repeatedly grip a rod attached to the bursting head and pull the rod as the other rod-gripping element releases the rod and moves to a new grip position on the rod, to progressively pull the bursting head along the pipe and burst the pipe to facilitate installation of a replacement pipe.

SUMMARY OF THE INVENTION

These and other objects of the invention are provided in a new and improved device for replacing an underground gas, water, sewer or other utility pipe by progressively cutting and bursting the pipe and drawing a replacement pipe into position behind the migrating burst point of the pipe being replaced. In a preferred embodiment the apparatus is characterized by a specially-designed rod-pulling device which is typically fitted with a pair of in-line, double-action hydraulic rod-driving members each having a rod-gripping element, and the rod-pulling device is typically situated in a manhole or excavation, at one end of the pipe to be replaced. A pull rod is extended through the rod-driving members of the rod-pulling device and through the pipe, and is attached to a stored energy head disposed in a typically conventional, tapered bursting head typically fitted with multiple blades which initially engage the opposite end of the pipe, A typically conventional pneumatic hammer is typically spring-biased against the stored energy head and a replacement pipe is removably attached to the bursting head. In typical operation, the rod-driving members of the rod-pulling device repeatedly and alternately grip, pull and release the pull rod and move to a new gripping position on the pull rod, and the pull rod pulls the stored energy head against the bursting head and thus, the bursting head against the pipe to be replaced as the pneumatic hammer repeatedly strikes the stored energy head against the bursting head The combined pulling action of the rod-pulling device and driving action of the hammer cause the bursting head to migrate along the pipe and progressively cut and rapture the pipe, and draw the replacement pipe into position behind the migrating burst point of the old pipe. A spring or springs fitted in the stored energy head are compressed and bias the stored energy head against the bursting head as the rod-pulling device pulls the rod against the stored energy head. As the hammer strikes the stored energy head against the bursting head, tension released by the springs augments the driving action of the hammer and assists the rod-pulling device and hammer in forcing the bursting head along the pipe. The pneumatic hammer is typically used in combination with the rod-pulling device only under circumstances in which valves, concrete encasement, timbers or other significant obstruction is likely to be encountered by the bursting head in or around the pipe being replaced. When obstructions are unlikely to be encountered by the bursting head, the rod-pulling device can be used without the pneumatic hammer to pull the bursting head along the pipe.

BRIEF DESCRIPTION OF THE DRAWINGS

The invention will be better understood by reference to the accompanying drawings, wherein:

FIG. 13 is a perspective view, partially in section, of the assembled bursting head and pneumatic hammer components of the apparatus, with a replacement pipe (illustrated in phantom) shown removably attached to the bursting head;

FIG. 14 is a perspective view of the bursting head and hammer components of the apparatus, more particularly illustrating a nose extension fitted on the bursting head for straightening and bursting an underground pipe having a swag or belly in operation of the apparatus;

FIG. 15 is an exploded, perspective view of a nose cap component of the bursting head of the apparatus;

FIG. 19 is an exploded, perspective view, partially in section, of the hammer and stored energy head components of the apparatus, more particularly illustrating a preferred technique for mounting the hammer in the stored energy head and the pull rod in the stored energy head of the apparatus by means of a specially-designed spring assembly;

FIG. 20 is a perspective view, partially in section, of the bursting head component of the apparatus, more particularly illustrating a preferred technique for mounting a gasket in the front end of the bursting head for preventing entry of mud and contaminants into the bursting head during operation of the apparatus;

DESCRIPTION OF THE PREFERRED EMBODIMENTS

Figure 2:
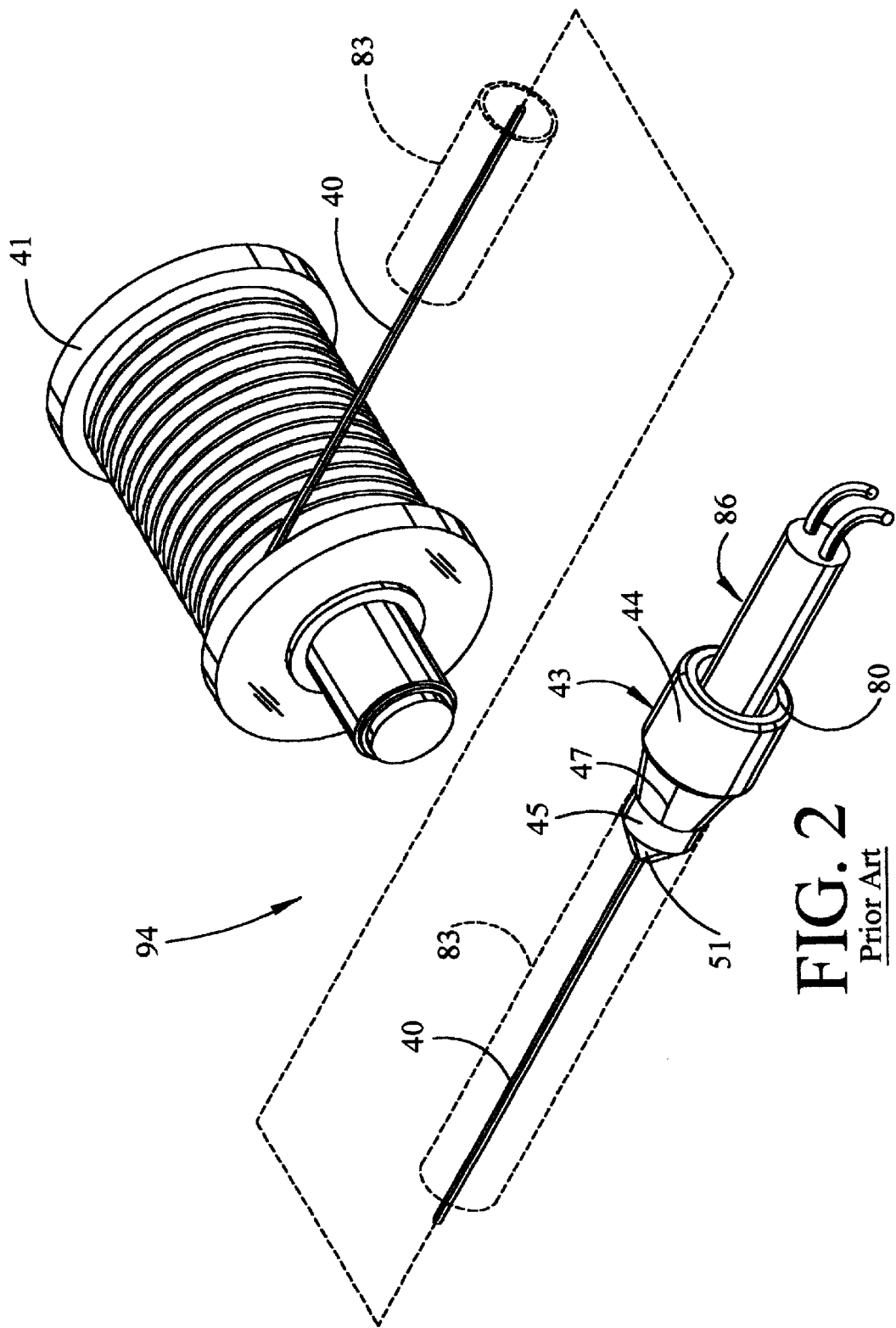
FIG. 2 is an exploded, perspective view of a typical prior art apparatus for bursting and replacing pipes.

Referring initially to FIG. 2 of the drawings, use of a typical prior art apparatus 94 for bursting and replacing an underground pipe 83 (illustrated in phantom) is shown in typical application of the apparatus 94. The prior art pipe bursting and replacing apparatus 94 typically includes a conventional hydraulic pull device (not illustrated) of selected design which engages a pull cable 40, typically wound on a cable spool 41, and is situated in a manhole or excavation (not illustrated) at one open end of the underground pipe 83 to be replaced. A conventional bursting head 43, typically characterized by a tapered expander 44 fitted with multiple pipe-cutting blades 47, as well as a nose 45 which extends from the expander 44, is typically positioned in a second manhole or excavation (not illustrated), provided at the opposite open end of the pipe 83. The pull cable 40 is initially extended from the pulling device (not illustrated) and through the pipe 83, and is attached to the nose 45 of the bursting head 43. The nose 45 of the bursting head 43 is next inserted in the end of the buried pipe 83, with the blades 47 engaging the end of the pipe 83. A pneumatic hammer 86 is typically fitted in the rear end of the bursting head 43, and a replacement pipe 80 (shown partially in section) is extended over the hammer 86 and removably attached to the expander 44 of the bursting head 43. In operation of the prior art pipe bursting and replacing apparatus 94, as the hydraulic pulling device (not illustrated) engages and exerts pulling pressure on the pull cable 40, the pull cable 40 pulls the blades 47 of the attached bursting head 43 it the opposite end of the pipe 83. Simultaneously, the pneumatic hammer 86 is typically operated to repeatedly and rapidly strike the bursting head 43, and the combined constant pulling action of the pull cable 40 and intermittent and rapid driving action of the pneumatic hammer 86 cause the bursting head 43 to migrate along the pipe 83 as the blades 47 of the bursting head 43 progressively cut and burst the pipe 83, until the bursting head 43 reaches the opposite end of the bursted pipe 83. Simultaneously, the replacement pipe 80, removably attached to the bursting head 43, is drawn into position behind the migrating burst point of the old pipe 83, through the pipe burrow. After the entire length of the old pipe 83 has been bursted and the bursting head 43 has reached the opposite end of the old pipe 83, the bursting head 43 is detached from the replacement pipe 80, which has been drawn into functional position and is connected to other pipes (not illustrated) in the water, sewer or gas piping system of which the replacement pipe 80 is a part.

Figure 1:
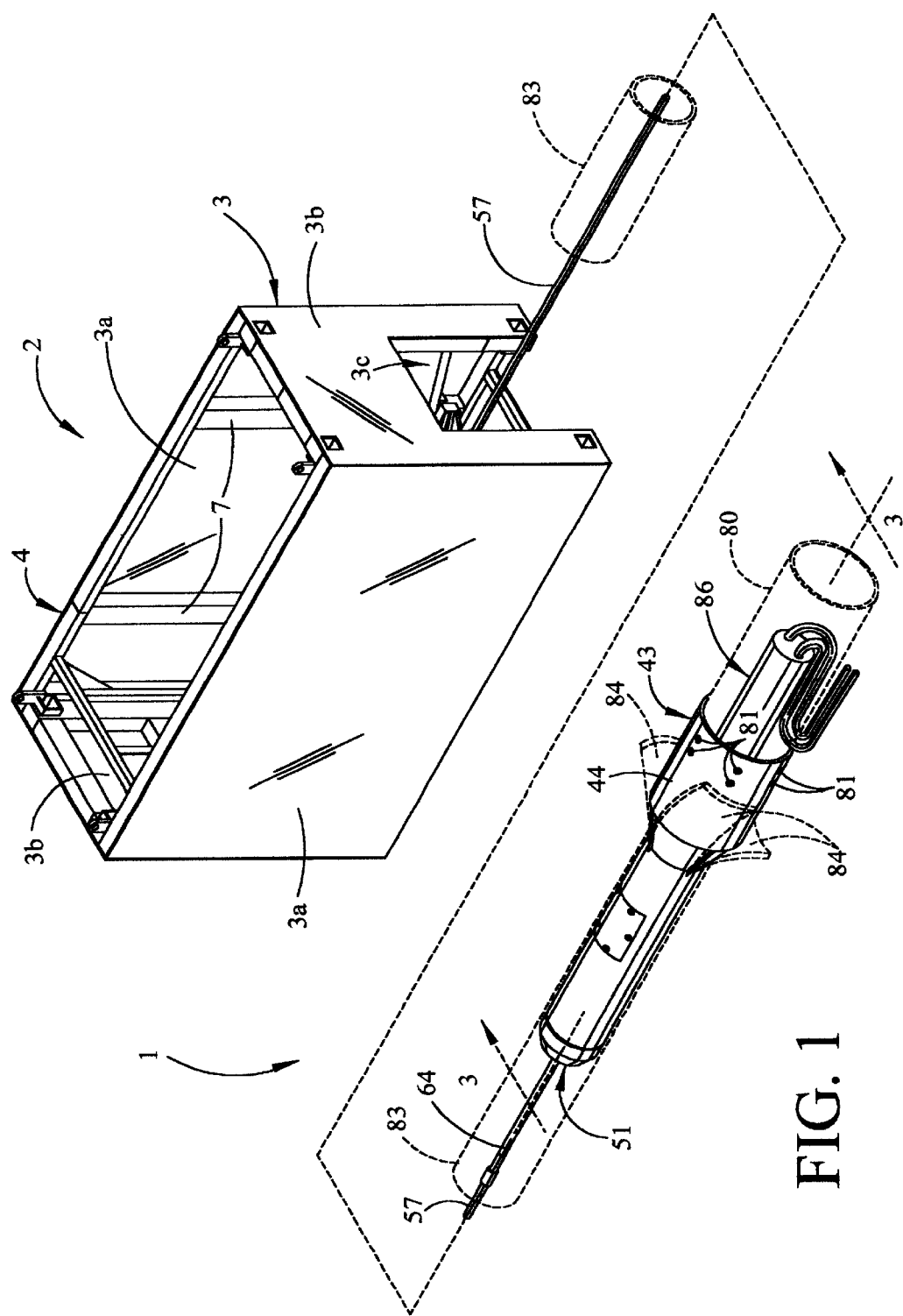
FIG. 1 is an exploded, perspective view of a preferred embodiment of the apparatus for bursting and replacing pipes of this invention.
Figure 3:
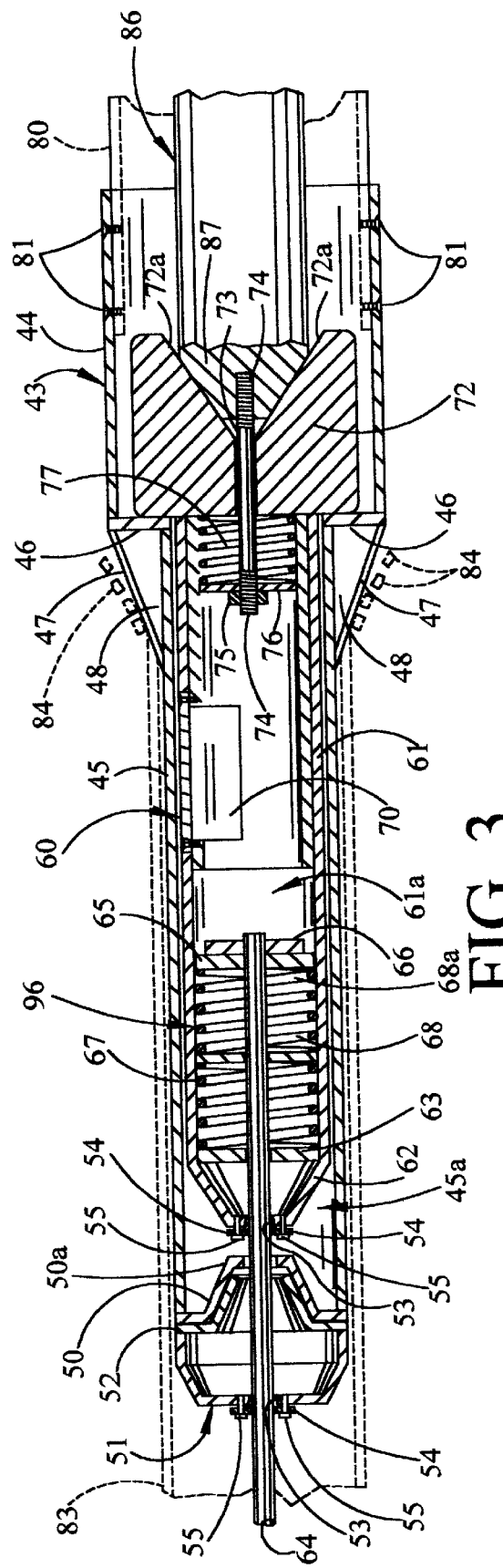
FIG. 3 is a longitudinal sectional view taken along section lines 3—3 in FIG. 1 of the stored energy head, bursting head and pneumatic hammer components of the apparatus of this invention, with the bursting head shown bursting a pipe (illustrated in phantom) and a replacement pipe (also illustrated in phantom) shown attached to the bursting head, in typical operation of the apparatus.
Figure 4:
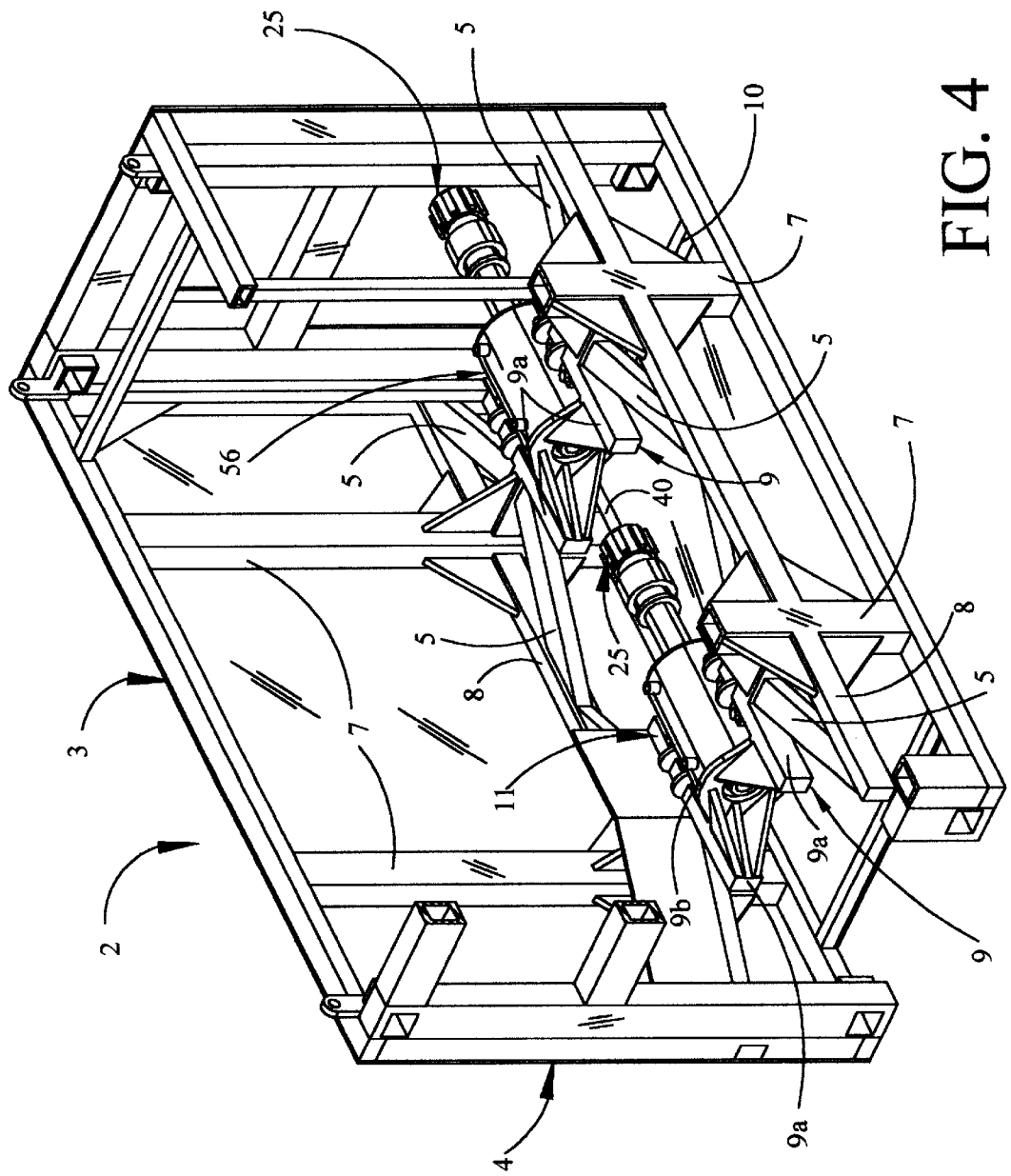
FIG. 4 is a perspective view, partially in section, of an illustrative frame for a typical rod-pulling device of the apparatus of this invention.

Referring next to FIGS. 1 and 3 of the drawings, in a preferred embodiment the apparatus for bursting and replacing pipes, hereinafter referred to as the apparatus, of this invention is generally illustrated by reference numeral 1 in FIG. 1. Briefly, the apparatus 1 includes a rod-pulling device 2, which in application of the apparatus 1 as hereinafter farther described is typically situated in a manhole or excavation (not illustrated) at one open end of an underground gas, water, sewer or other utility pipe 83 (illustrated in phantom) to be replaced. A typically conventional, tapered bursting head 43, fitted with a specially-designed stored energy head 60 (illustrated in longitudinal cross-section in FIG. 3) of this invention, is positioned in a second manhole or excavation (not illustrated) and engages the opposite end of the pipe 83. A pull rod 57, engaged by the rod-pulling device 2, is extended through the pipe 83 and is attached to a stored energy head rod 64 (FIG. 3) which extends through the nose 45 of the bursting head 43 and is attached to the stored energy head 60. A conventional pneumatic hammer 86 is typically fitted against a machined head 72 provided on the rear end of the stored energy head 60, particularly under circumstances in which obstructions are likely to be encountered by the bursting head 43 in the pipe 83, for intermittently striking the stored energy head 60 against the bursting head 43 and thus, the bursting head 43 against the pipe 83. A replacement pipe 80 (illustrated in phantom) is typically removably screwed or bolted to the bursting head 43. In application of the apparatus 1 as hereinafter described, the constant pulling action of the rod-pulling device 2 on the pull rod 57, combined with the intermittent and rapid pushing action of the hammer 86 on the machined head 72 of the stored energy head 60, causes the bursting head 43 to progressively cut and burst the pipe 83 as the bursting head 43 migrates along the pipe 83 and draws the replacement pipe 80 into position. As will be hereinafter described, the specially-designed stored energy head 60 is fitted with a spring assembly 96 (FIG. 3), the springs of which in operation of the apparatus 1 become compressed and bias the stored energy head 60 against the bursting head 43 and thus, the bursting head 43 against the pipe 83 as the stored energy head rod 64 pulls against the attached stored energy head 60. Consequently, when the pneumatic hammer 86 strikes the stored energy head 60 against the bursting head 43, tension is released by the compressed springs of the spring assembly 96, and this augments the driving action of the pneumatic hammer 86 and assists the rod-pulling device 2 and hammer 86 in forcing the bursting head 43 along the pipe 83. Replacement of the pipe 83 can thus be facilitated in a quicker manner than can be achieved by using the conventional prior art pipe bursting and replacing apparatus 94 for the purpose, particularly under circumstances in which valves, concrete encasement, timbers and other obstructions are encountered by the migrating burst head 43 in the pipe 83.

Figure 5:
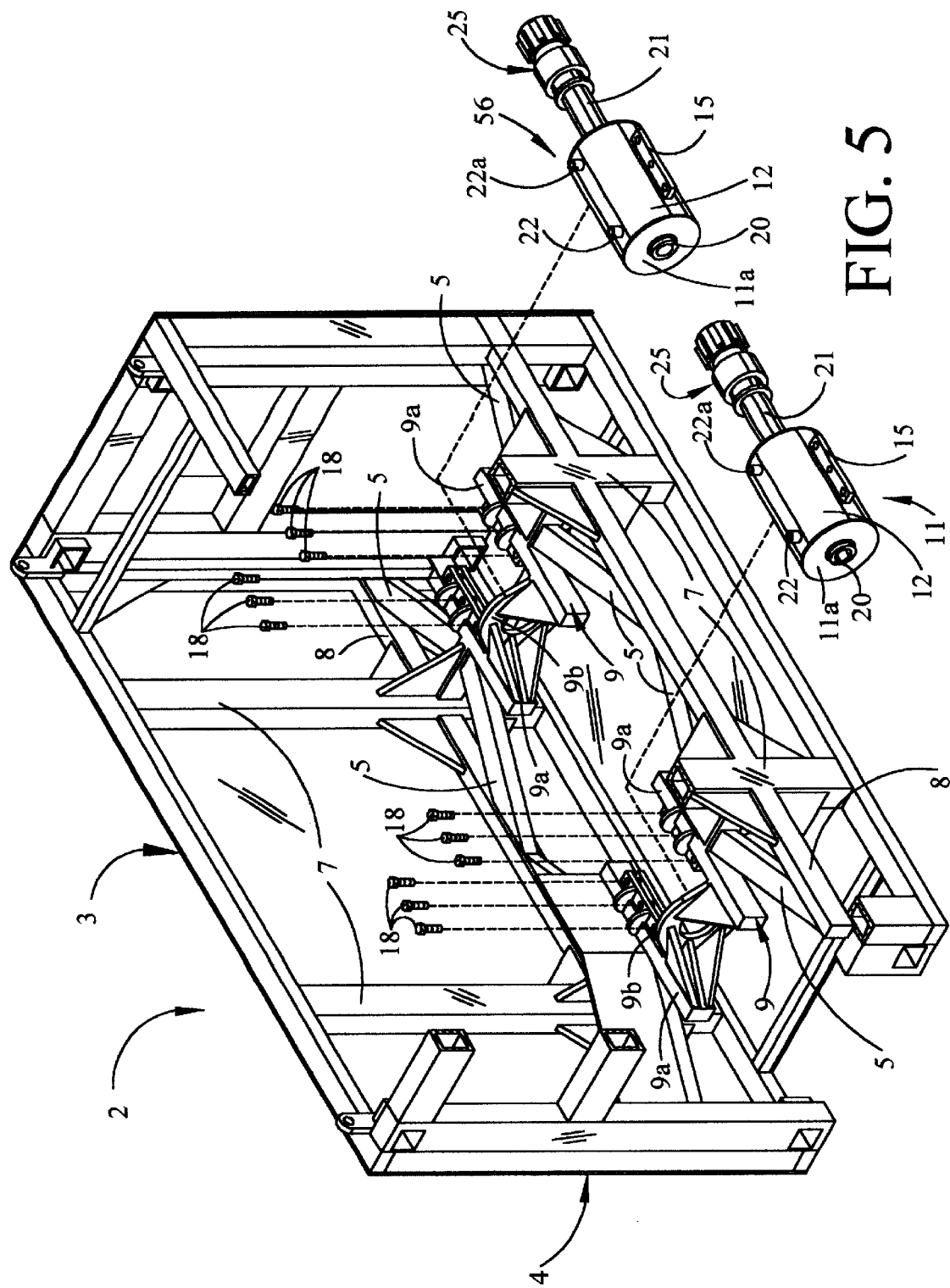
FIG. 5 is an exploded, perspective view, partially in section, of the frame of the rod-pulling device illustrated in FIG. 4, more particularly illustrating a preferred, bolt technique for mounting a pair of rod-driving members of the rod-pulling device on the frame.

Referring again to FIG. 1 and to FIGS. 4–12 of the drawings, the rod-pulling device 2 of the apparatus 1 is typically characterized by a housing 3 having side panels 3a and end panels 3b, each end panel 3b having a typically rectangular rod opening 3c. The side panels 3a and end panels 3b are supported by a housing frame 4 which mounts a front double-action hydraulic rod-driving member 11 and a substantially identical, rear hydraulic rod-driving member 56, as illustrated in FIG. 5 and hereinafter described. It will be appreciated by those skilled in the art that the front hydraulic rod-driving member 11 and rear hydraulic rod-driving member 11 of the rod-pulling device 2 of this invention can be used with any properly designed frame 4, the frame 4 illustrated in the drawings being specifically designed to receive and mount the front rod-driving member 11 and rear rod-driving member 56 in substantially aligned relationship with respect to each other in rod-pulling configuration, as hereinafter further described. Typically, the housing frame 4 includes a pair of parallel, vertical brace members 7 on each side of the housing frame 4, and a horizontal brace member 8 spans the vertical brace members 7 on each side of the housing frame 4. Two pairs of angled mount frame braces 5 are typically welded to each horizontal brace member 8 and extend into the housing 3, as particularly illustrated in FIGS. 6 and 7. A driving member mount frame 9, adapted for receiving and mounting the corresponding front rod-driving member 11 and rear rod-driving member 56, as hereinafter described is mounted between the corresponding pairs of mount frame braces 5 on opposite sides of the housing frame 4. Each driving member mount frame 9 is typically characterized by a pair of elongated, parallel mount bars 9a which are typically welded to the corresponding pair of angled mount frame braces S on the corresponding side of the housing frame 4, and a typically circular mount flange 9b is mounted between each of parallel mount bars 9a.

Figure 6:
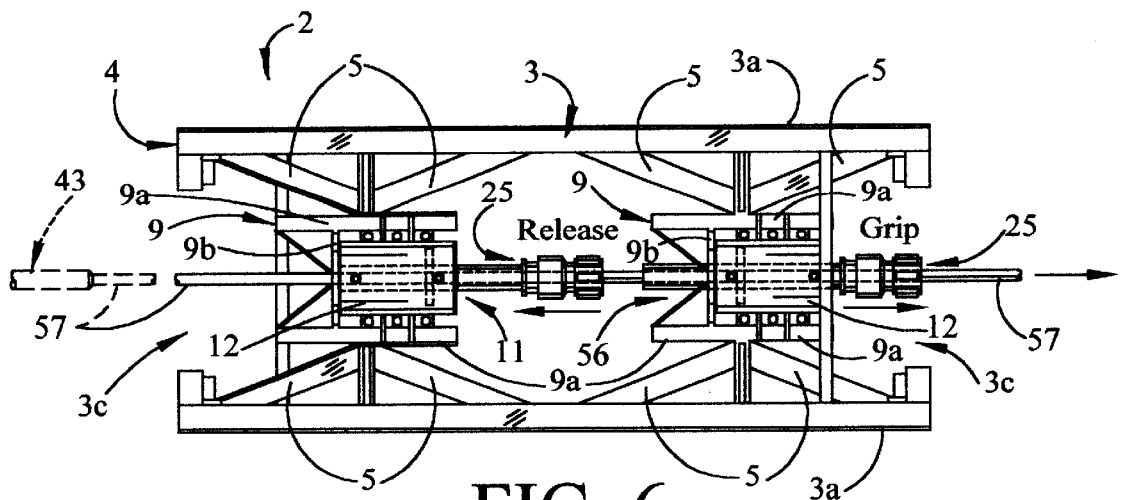
FIG. 6 is a top view of the rod-pulling device, with a rear rod-driving member shown in the rod-gripping and driving configuration and a front rod-driving member shown in the rod-releasing configuration in typical operation of the apparatus of this invention.
Figure 7:
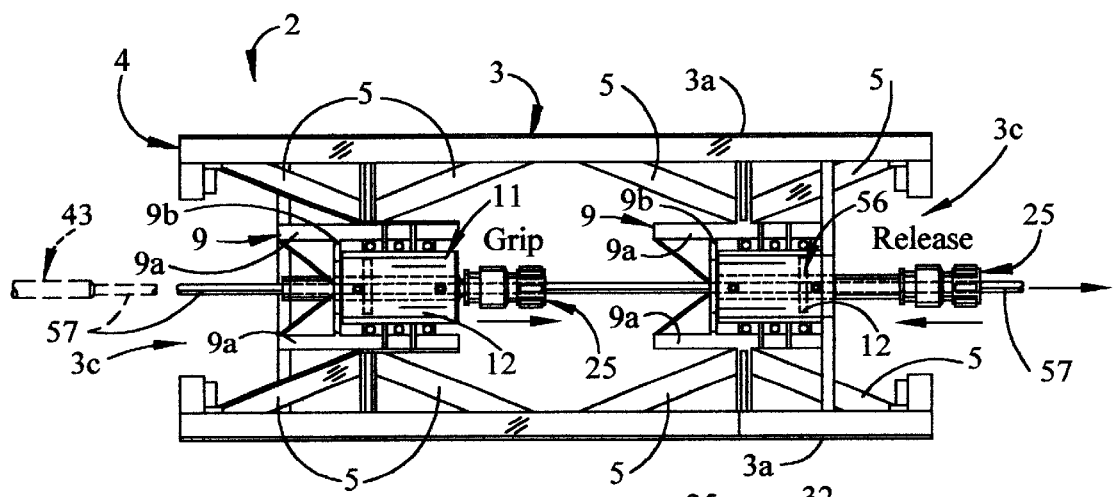
FIG. 7 is a top view of the rod-pulling device illustrated in FIG. 6, with the rear rod-driving member shown in the rod-releasing configuration and the front rod-driving member shown in the rod-gripping configuration in typical operation of the apparatus.
Figure 8:
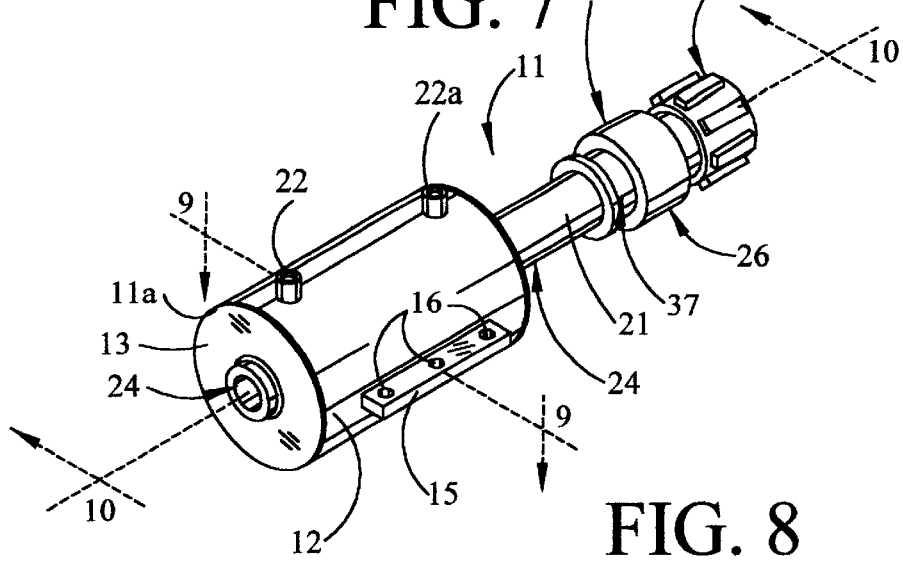
FIG. 8 is a perspective view of a rod-driving member component of the rod-pulling device of the apparatus.
Figure 9:
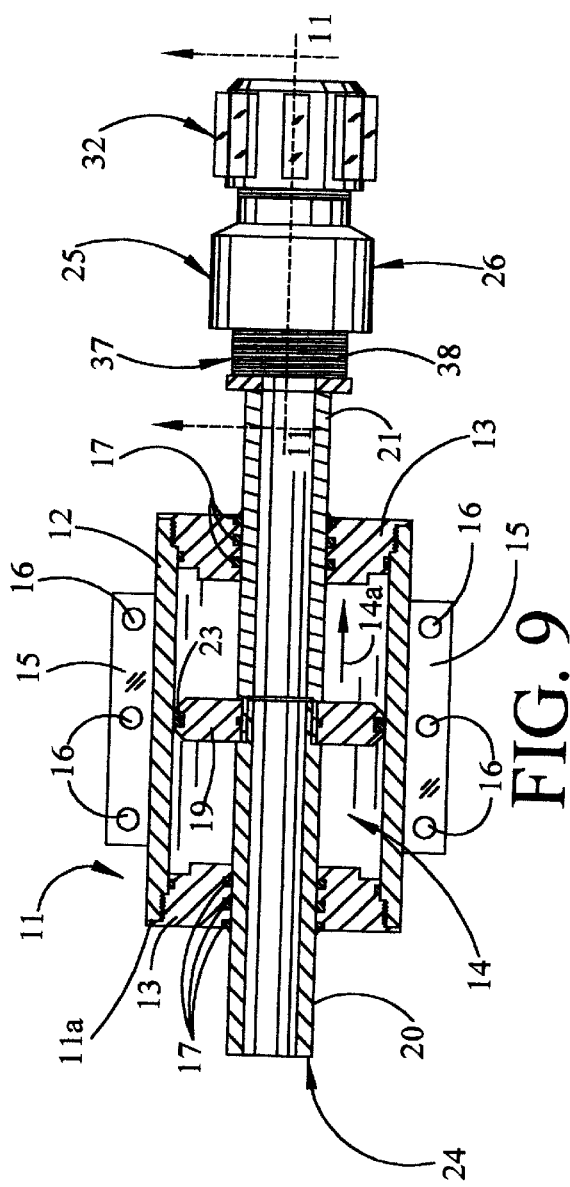
FIG. 9 is a sectional view, taken along section line 9—9 in FIG. 8, of the rod-driving member.
Figure 10:
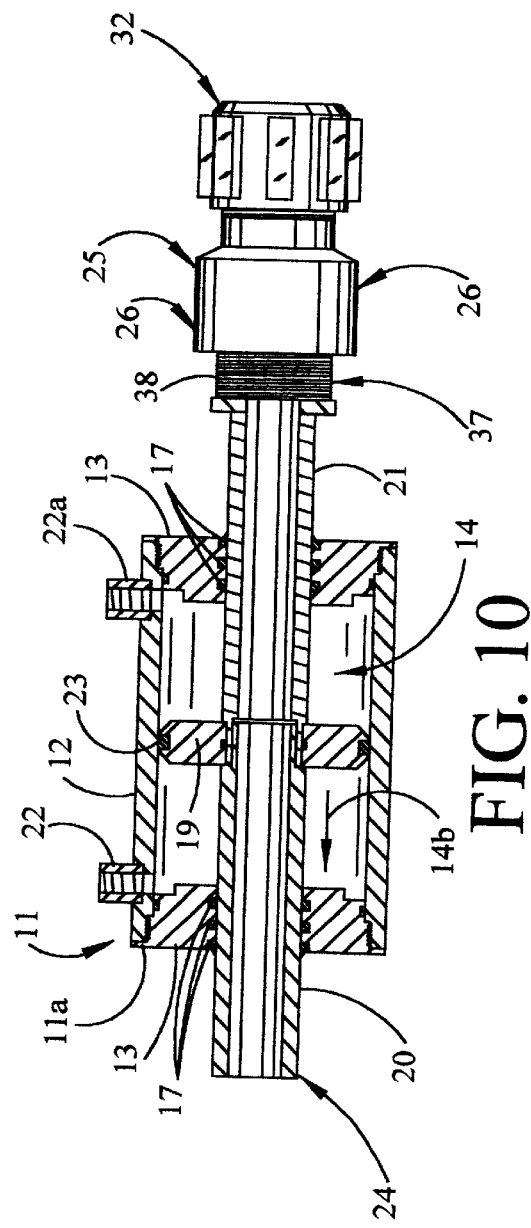
FIG. 10 is a sectional view, taken along section line 10—10 in FIG. 8, of the rod-driving member.

As further illustrated in FIGS. 6 and 7, the aligned front rod-driving member 11 and rear rod-driving member 56 of the rod-pulling device 2 are designed to receive and continually pull a pull rod 57 through the rod-pulling device 2 by alternately and repeatedly gripping, pulling and releasing the pull rod 57 in application of the apparatus 1, as hereinafter described. As illustrated in FIGS. 8–10, the double-action hydraulic front rod-driving member 11 and rear rod-driving member 56 each is typically characterized by an elongated hydraulic cylinder 12, having an interior fluid chamber 14 each end of which is sealed by an end plate 13, typically threaded into the corresponding end of the hydraulic cylinder 12. As illustrated in FIG. 10, a front hydraulic fluid port 22 and a rear hydraulic fluid port 22a are provided in fluid communication with he fluid chamber 14 of the hydraulic cylinder 12, adjacent to respective ends thereof for attachment to a conventional hydraulic plump system (not illustrated) and facilitating selective flow of hydraulic fluid (not illustrated) into and out of the fluid chamber 14 through the front hydraulic fluid port 22 or rear hydraulic fluid port 22a, as hereinafter described. A first pipe segment 20 of an elongated rod pipe 24 is slidably mounted in a central plate opening (not illustrated) provided in one of the end plates 13, and is sealed against the end plate 13 typically by means of multiple o-rings 17. The first pipe segment 20 is typically joined to a second pipe segment 21 of the rod pipe 24 in the fluid chamber 14 of the hydraulic cylinder 12. The second pipe segment 21 is slidably mounted in a central plate opening (not illustrated) provided in the second end plate 13, and is sealed therein typically by means of multiple o-rings 17. A disc-shaped piston 19, slidably disposed in the fluid chamber 14 of the hydraulic cylinder 12, is seated on the rod pipe 24, typically at the junction of the first pipe segment 20 with the second pipe segment 21 and is sealed against the interior surface of the hydraulic cylinder 12 typically by means of a piston o-ring 23. According , pressurized flow of hydraulic fluid from the hydraulic pump system (not illustrated), through a selected one of the front hydraulic fluid port 22 and rear hydraulic fluid port 22a and into the fluid chamber 14 of the hydraulic cylinder 12 facilitates application of fluid pressure to either face of the piston 19, thereby causing the piston 19 and mounted rod pipe 24 to traverse the fluid chamber 14 in a selected direction as the rod pipe 24 is slidably extended through the respective end plates 13, as hereinafter described. A pair of cylinder mount ranges 15 is mounted on the hydraulic cylinder 12 in substantially diametrically-spaced relationship with respect to each other, and each is provided with multiple bolt openings 16. As further illustrated in FIG. 5, the front rod-driving member 11 and rear rod-driving member 56 are each mounted on the corresponding driving member mount frame 9 of the housing frame 4 by seating the front end 11a of the front rod-driving member 11 or rear rod-driving member 56 against the mount flange 9b of the corresponding driving member mount frame 9, and resting the cylinder mount flanges 15 on respective mount bar flanges (not illustrated) provided on the mount bars 9a. Mount bolts 18 are extended through the respective bolt openings 16 of the cylinder mount flanges 15 and threaded into respective bolt openings (not illustrated) provided in the mount bar flanges, to secure the front rod-driving member 11 and rear rod-driving member 56 in substantially aligned relationship with respect to each other on the housing frame 4 of the rod-pulling device 2, as particular illustrated in FIG. 4.

Figure 11:
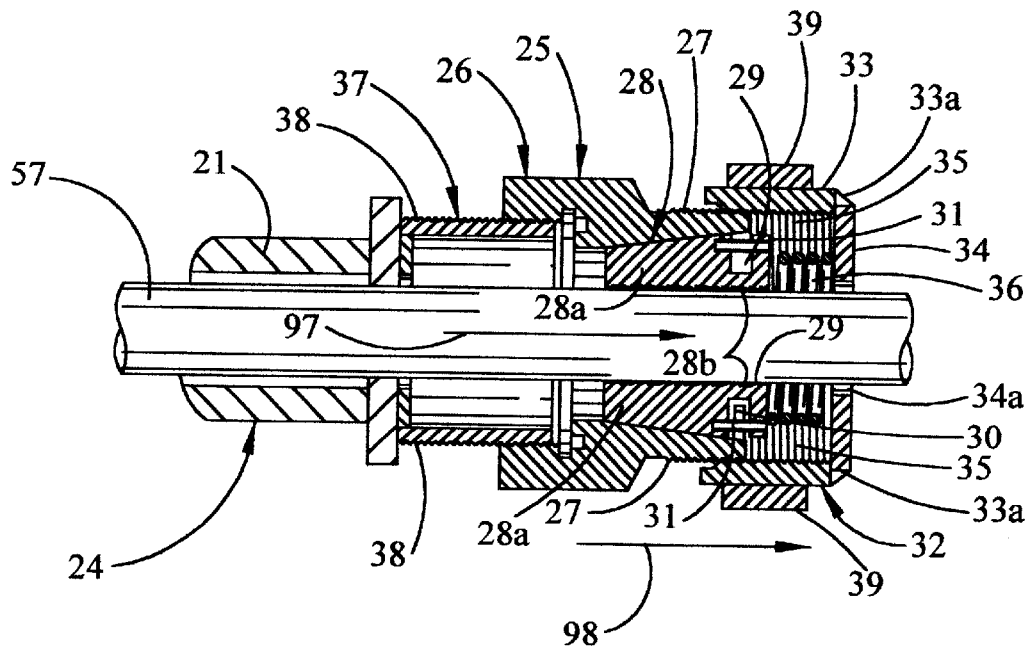
FIG. 11 is a sectional view, taken along section line 11—11 in FIG. 9, of a rod-gripping element of each front and rear rod-driving member, more particularly illustrating the rod-gripping element in the rod-gripping configuration in operation of the apparatus.
Figure 12:
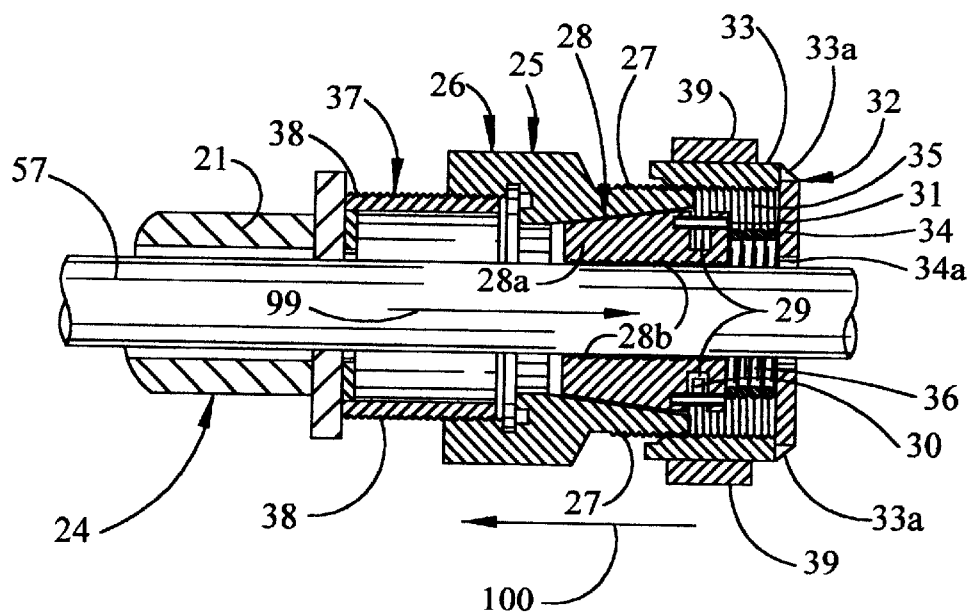
FIG. 12 is a sectional view, taken along section line 11—11 in FIG. 9, of the rod-gripping element of each front and rear rod-driving member, more particularly illustrating the rod-gripping element in the rod-release configuration in operation of the apparatus.

As illustrated in FIG. 8, a rod-gripping element 25, which is described in my U.S. pat. application Ser. No. 09/126,038, is typically mounted on the extending end of the second pipe segment 21 of the rod pipe 24 of the front rod-driving member 11 and rear rod-driving member 56, respectively. As illustrated in FIGS. 11 and 12, each rod-gripping element 25 is characterized by a cylindrical male coupling 37, typically welded to the end of the second pipe segment 21 and having exterior male coupling threads 38. The male coupling 37 threadibly receives a cylindrical adaptor body 26, having eternal adaptor threads 27. A tapered bore (not illustrated) is provided in the adaptor body 26 for receiving a wedge 28 having a wedge taper that matches the tapered bore in the adaptor body 26. The wedge 28 is characterized by three wedge segments 28a which are pivotally attached to each other, and wedge teeth 28b, provided on the interior faces of the respective wedge segments 28a, removably engage the pull rod 57 in operation of the apparatus 1, as hereinafter described. The wedge segments 28a are assembled in articulating, pivoting fashion to define the wedge 28 by means of a pair of retainer bars 30, which slidably engage circumferential retainer pin slots 29 provided in the respective wedge segments 28a The retainer bars 30 are maintained in position in the curved retainer pin slots 29 by means of roll pins 31, inserted in roll pin seats (not illustrated) that extend through the retainer pin slots 29. A pipe coupling 32 defines the front end of the rod-gripping element 25 and closes the adaptor body 26. The pipe coupling 32 includes a cover plate 34, typically welded to the end of a cylindrical collar 33 at a weld 33a and includes internal pipe coupling threads 35 in the collar 33. Multiple hammer flanges 39 are typically radially welded to the collar 33 for assembling and disassembling the pipe coupling 32 on the on the front end of the adaptor body 26 as the internal pipe coupling threads 35 engage the external adaptor threads 27 on the adaptor body 26. A cover plate rod opening 34a is provided in the cover plate 34 for accommodating the pull rod 57. A coil spring 36 is also provided in the pipe coupling 32 and encircles the pull rod 57, with one end of the coil spring 36 typically Welded to the cover plate 34 and the opposite end engaging the wedge 28. Accordingly, when the pipe coupling 32 and me coupling 37 are threadibly assembled on the adaptor body 26 the rod-gripping element 25 is configured as illustrated in FIGS. 11 and 12 of the drawings.

Referring again to FIGS. 6–12 of the drawings, in operation of the rod-pulling device 2 in typical application of the apparatus 1 as hereinafter described, the pull rod 57 is initially extended through the rod pipe 24 and attached rod-gripping element 25 of the respective aligned and frame-mounted front rod-driving member 11 and rear rod-driving mender 56, as illustrated in FIGS. 11 and 12, with the pull rod 57 extending through the rod openings 3c (FIG. 1) of the end panels 3b at the respective ends of the housing 3 of the rod-pulling device 2, as illustrated in FIGS. 6 and 7. The pipe coupling 32 (FIGS. 11 and 12) is initially partially threaded on the adaptor body 26 of the rod-gripping element 25 of each corresponding front rod-driving member 11 and rear rod-driving member 56, to slightly compress the coil spring 36 between the cover plate 34 of the pipe coupling 32 and the wedge segments 28a of the wedge 28. This action causes the wedge segments 28a to pivot inwardly on the retainer bars 30 and thus, the wedge teeth 28b to lightly engage the pull rod 57, as the coil spring 36 partially forces and compresses the wedge 28 into the narrowing tapered bore (not illustrated) of the adaptor body 26, Pressurized hydraulic fluid (not illustrated) is then introduced into the fluid chamber 14 of the hydraulic cylinder 12 of the rear rod-driving member 56, through the front hydraulic fluid port 22 (FIG. 10) thereof The hydraulic fluid applies pressure to the piston 19 to facilitate rearward displacement of the piston 19 in the fluid chamber 14, as indicated by the arrow 14a in FIG. 9 and thus, rearward extension of the rod pipe 24 from the hydraulic cylinder 12 of the rear rod-driving member 56 and rearward movement of the rod-gripping element 25 of the rear rod-driving member 56, as further indicated by the arrow 98 in FIG. 11 . Simultaneously, friction between the wedge teeth 28b of the wedge segments 28a and the initially stationary pull rod 57 causes the wedge 28 to initially remain stationary with the pull rod 57 inside the moving adaptor body 26 and slide into the increasingly narrow portion of the tapered bore of the adaptor body 26, assisted by the compressed coil spring 36. Consequently, the wedge segments 28a of the wedge 28 tend to compress in the adaptor body 26 and pivot inwardly on the retainer bars 30, and the wedge teeth 28b thus tightly engage the pull rod 57, as illustrated in FIG. 11. Continued rearward extension of the rod pipe 24 from the hydraulic cylinder 12 and thus rearward movement of the rod-gripping element 25 as indicated by the arrow 98 in FIG. 11, causes the rod-gripping element 25 of the rear rod-driving member 56, tightly gripping the pull rod 57 at the wedge teeth 28b, to pull the pull rod 57 rearwardly through the housing 3 of the rod-pulling device 2, as indicated by the arrow 97 in FIG. 11 and as further illustrated in FIG. 6. After the full throw of the rod pipe 24 (FIG. 9) from the hydraulic cylinder 12 of the rear rod-driving member 56 has been reached, like extension of the rod pipe 24 from the hydraulic cylinder 12 of the front rod-driving member 11 is begun by introducing pressurized hydraulic fluid into the front hydraulic fluid port 22 (FIG. 10) of the front rod-driving member 11. This action facilitates rearward extension of the rod pipe 24 from the hydraulic cylinder 12 and thus, gripping and pulling of the pull rod 57 by operation of the rod-gripping element 25 of the front rod-driving member 11 as illustrated in FIG. 7 and in the same manner as heretofore described with respect to the rear rod-driving member 56 in FIG. 6. Simultaneously, pressurized hydraulic fluid is introduced into the fluid chamber 14 of the hydraulic cylinder 12 of the rear rod-driving member 56 through the rear hydraulic fluid port 22a, and the hydraulic fluid pushes the piston 19 rearwardly in the fluid chamber 14 in the direction indicated by the arrow 14b in FIG. 10. Consequently, the rod pipe 24 and attached rod-gripping element 25 of the rear rod-driving member 56 are drawn forwardly as indicated by the arrow 100 in FIG. 12, while the pull rod 57 is pulled rearwardly through the rear rod-driving member 56 as indicated by the arrow 99, by simultaneous operation of the front rod-driving member 11 as heretofore described. This forward motion of the rod-gripping element 25 of the rear rod-driving member 56, indicated by the arrow 100 in FIG. 12, causes the friction between the wedge teeth 28b of the wedge segments 28a of the initially stationary wedge 28 and the pull rod 57, moving in the rearward direction as indicated by the arrow 99, to draw the wedge 28 into the wider portion of the tapered bore of the adaptor body 26, as further illustrated in FIG. 12. Consequently, the wedge 28 slightly expands in the tapered bore of the adaptor body 26 as the wedge segments 28a pivot on the retainer bars 30, The wedge teeth 28b thus only lightly engage the pull rod 57, and enable substantially unhindered sliding of the rod-gripping element 25 of the rear rod-driving member 56 to the original grip position on the pull rod 57, as further illustrated in FIG. 7. After the rod-gripping element 25 of the rear rode member 56 again reaches the grip position illustrated in FIG. 6, the rod pipe 24 is again extended rearwardly from the hydraulic cylinder 12 of the rear rod-driving member 56 to facilitate gripping and continued rearward extension of the pull rod 57 through the housing 3 of the rod-pulling device 2 as the rod-gripping element 25 of the front rod-driving member 11, disposed in the release configuration, again slides to the original grip position on the pull rod 57 as illustrated in FIG. 6. In the foregoing manner, the front rod-driving member 11 and rear rod-driving member 56 alternately and repeatedly grip, pull and release the pull rod 57 and while in the rod-release configuration, return to the original rod-gripping position to facilitate continuous pulling of the pull rod 57 through the housing 3 of the rod-pulling device 2.

Referring again to FIGS. 1 and 3 and to FIGS. 13, 15 and 17–23 of the drawings, the apparatus 1 further includes a typically conventional pie bursting head 43, provided on the end of the pull rod 57 opposite the rod-pulling device 2 as illustrated in FIG. 1 and hereinafter described. As particularly illustrated in longitudinal cross-section in FIG. 3, the pipe bursting head 43 is typically characterized by a cylindrical expander 44, attached to the rear end of an elongated, cylindrical nose 45 having a nose interior 45a, by means of an annular shoulder 46 which is typically welded to the front end of the expander 44 and to the rear end of the nose 45. The rear end portion of the nose 45 of the bursting head 43 is characterized by a tapered wall 48, typically characterized by solid steel or weld material, which reinforces the shoulder 46 against the expander 44 of the bursting head 43. Multiple pipe-cutting blades 47 are typically welded to the tapered wall 48 of the bursting head 43, in spaced-apart relationship with respect to each other about the circumference of the bursting head 43. A female threaded coupling 50 terminates the front end of the nose 45 of the bursting head 43, and threadibly receives a companion male threaded coupling 52 of a nose cap 51, provided with a central cap opening 51a, as illustrated in FIG. 15. A rubber gasket 53 is typically fitted in the nose cap 51, and receives a stored energy head rod 64 which is attached to the pull rod 57, as illustrated in FIG. 13 and hereinafter further described. The gasket 53 prevents entry of mud, dirt, sludge and other contaminants into the nose interior 45a of the bursting head 43 through the cap opening 51a, in application of the apparatus 1 as hereinafter described. Accordingly, the cap opening 51a receives the gasket 53 and a retainer washer 54 is typically mounted on the nose cap 51 over the gasket 53, by extending bolts 55 through respective bolt openings 55a provided in the retainer washer 54 and threading the bolts 55 into respective bolt openings 55b, provided in the nose cap 51 as further illustrated in FIG. 15.

As further illustrated in FIG. 3, the pipe bursting head 43 is fitted with a specially-designed stored energy head 60 of this invention, typically of steel construction and having an elongated, cynical body 61 preferably characterized by schedule 80 pipe of selected length and diameter and having a body interior 61a. The body 61 of the stored energy head 60 is terminated on the front end thereof by a tapered or cone-shaped nose 62, having a nose opening 62a which communicates with the body interior 61a, as illustrated in FIG. 20. A gasket 53, typically fitted in the nose opening 62a of the nose 62 in the same manner as heretofore described with respect to the nose cap 51 of the bursting head 43 illustrated in FIG. 15, receives the stored energy head rod 64 as illustrated in FIG. 3 and prevents entry of mud, dirt, sludge and other impurities into the body interior 61a of the stored energy head 60. A steel nose plate 63, typically at least about 1" thick and provided with a central nose plate opening (not illustrated), is typically welded to the body 61 of the stored energy head 60, in the body interior 61a at the base of the nose 62 as further illustrated in FIG. 3. A rectangular window 78 is typically provided in the body 61 of the stored energy head 60 for accessing the interior 61a of the body 61, as hereinafter described, and a pair of recessed reinforcing bars 79, each fitted with multiple screw openings 79a, typically span the window 78 in the body 61, as illustrated in FIG. 19. A rectangular window plate 70, also fitted with multiple screw openings 71, is removably fitted in the window 78 and is secured to the body 61 typically by extending screws 70a through the respective screw openings 71 in the window plate 70 and threading the screws 70a through the respective registering screw opens 79a in the reinforcing bars 79. A typically cylindrical machined head 72, typically constructed of solid milled steel and having a tapered, concave hammer seat 72a recessed in the rear end thereof, as illustrated in FIG. 3, is typically welded on the rear end of the body 61 of the stored energy head 60 and is configured for receiving the congruent tapered, cone-shaped nose 87 of the conventional pneumatic hammer 86 for purposes which will be hereinafter described. As further illustrated in FIG. 3, the body 61 of the stored energy head 60 is disposed inside the elongated nose interior 45a of the nose 45 of the conventional bursting head 43, with the front surface of the machined head 72 of the stored energy head 60 removably engaging the shoulder 46 of the bursting head 43, for purposes which will be hereinafter described.

Figure 22:
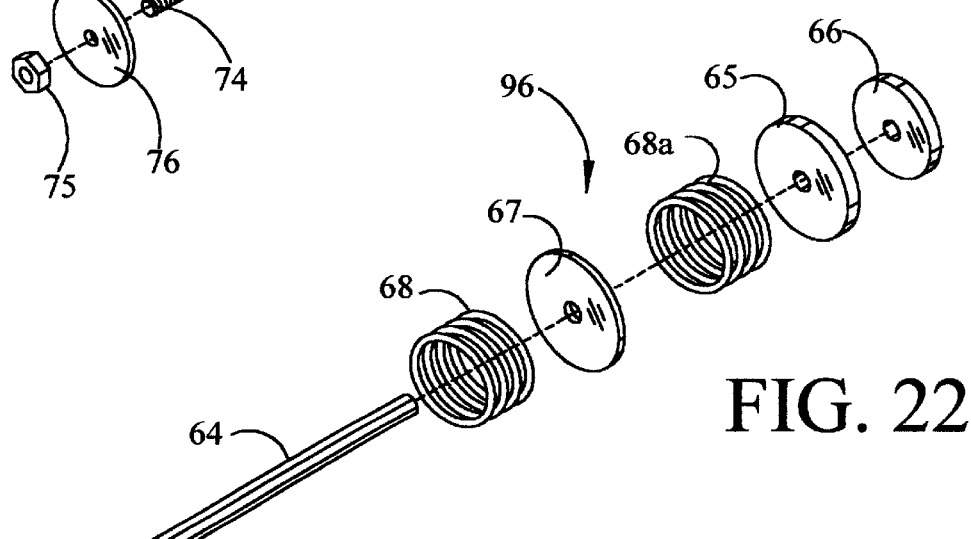
FIG. 22 is an exploded, perspective view of the specially-designed spring assembly of the stored energy head of the apparatus.
Figure 23:
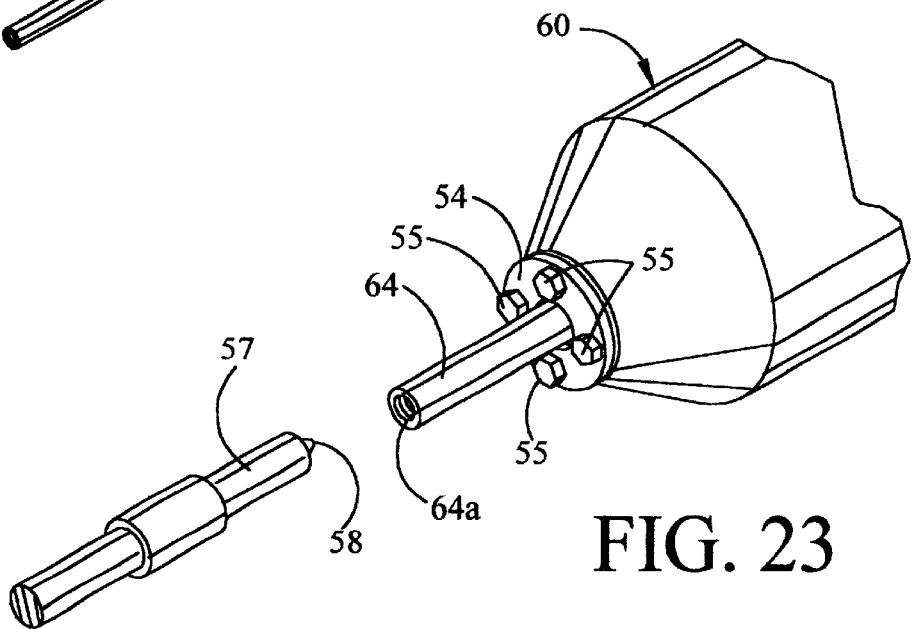
FIG. 23 is an exploded, perspective view, partially in section, of the stored energy head, more particularly illustrating removable attachment of the pull rod component of the apparatus to the stored energy head.

Referring against to FIGS. 3 and 13 and to FIGS. 19 and 21–23 of the drawings, the stored energy head rod 64 extends through the gasket 53 and an aligned male coupling opening (not illustrated) provided in the male threaded coupling 52 (FIG. 3) of the nose cap 51, and through a registering coupling opening 50a of the female threaded coupling 50 of the bursting head nose 45, and through the nose opening 62a (FIG. 20) of the stored energy head nose 62 and finally, through the central nose plate opening (not illustrated) provided in the nose plate 63 (FIG. 3) in the body interior 61a of the stored energy head body 60, respectively, and terminates in the body interior 61a A spring assembly 96, the purpose of which will be hereinafter described, is mounted on the stored energy head rod 64 inside the body interior 61a of the stored energy head body 61. As illustrated in FIGS. 3 and 22, the spring assembly 96 includes a rod plate 65, typically welded on the stored energy head rod 64 adjacent to the end thereof inside the body interior 61a and reinforced by a plate washer 66, also typically welded on the stored energy head rod 64. A circular spring plate 67 is typically welded on the stored energy head rod 64, in spaced-apart relationship to the rod plate 65. A first stored energy spring 68, typically having about 12,000–150,000 lbs. of spring tension, is interposed between the nose plate 63 and the spring plate 67, and a second stored energy spring 68a is interposed between the spring plate 67 and the rod plate 65, respectively, of the spring assembly 96 for purposes which will be hereinafter described. The rod plate 65 must be welded on the stored energy head rod 64 typically with sufficient strength to withstand at least about 200,000 lbs. of pressure as the rod plate 65 is pulled by the stored energy head rod 64 against the second stored energy spring 68a, in application of the apparatus 1 as hereinafter described, and is typically at least about 1" thick. The stored energy head rod 64 is removably attached to the pull rod 57 typically as illustrated in FIG. 23, by threading a rod nipple 58, proved on the end of the pull rod 57, into a companion nipple opening 64a, provided in the end of the stored energy head rod 64, as hereinafter further described.

As illustrated in FIGS. 3,19, 21 and 22 of the drawings, under circumstances in which obstructions are likely to be encountered by the bursting head 43 in the pipe 83 (illustrated in phantom in FIG. 1) to be replaced, the typically conventional pneumatic hammer 86 is used in conjunction with the rod-pulling device 2 (FIG. 1) to drive the bursting head 43 along the pipe 83. Accordingly, the tapered, cone-shaped hammer nose 87 of the pneumatic hammer 86 is fitted against the substantially congruent, concave hammer seat 72a of the machined head 72 of the stored energy head 60. An elongated bolt 73, terminated on each end by multiple bolt threads 74, extends through a central bolt opening (not illustrated) provided in the machined head 72, and one end of the bolt 73 threadibly engages the hammer nose 87 of the hammer 86. The opposite end of the bolt 73, terminating inside the body interior 61a of the stored energy head body 61, receives a washer 76. A hammer spring 77, preferably having a tension of about 12,000 lbs., is interposed between the washer 76 and the front surface of the machined head 72 inside the body interior 61a, and a nut 75, threaded on the bolt threads 74 of the bolt 73, secures the washer 76 on the bolt 73, against the hammer spring 77. Accordingly, the hammer nose 87 of the hammer 86 is biased against the congruent hammer seat 72a of the machined head 72 by operation of the hammer spring 77, which facilitates precision striking of the hammer nose 87 against the hammer seat 72a in typical operation of the apparatus 1, as hereinafter described. It will be appreciated by those skilled in the art that the nut 75, washer 76 and hammer spring 77 can be accessed through the window 78 (FIG. 19) of the stored energy head body 61 by unthreading the screws 70a from the respective screw openings 79a of the reinforcing bars 79 and screw opens 71 of the window plate 70, and removing the window plate 70 from the window 78. As further illustrated in FIG. 18, a replacement pipe 80 (illustrated in phantom) of selected size and construction is typically removably attached to the expander 44 of the bursting head 43 by initially inserting the front end of the replacement pipe 80 into the open rear end of the expander 44 and extending pipe screws 81 through respective screw openings 44a, provided in the expander 44, and registering screw openings 80a, provided in the replacement pipe 80.

Figure 17:
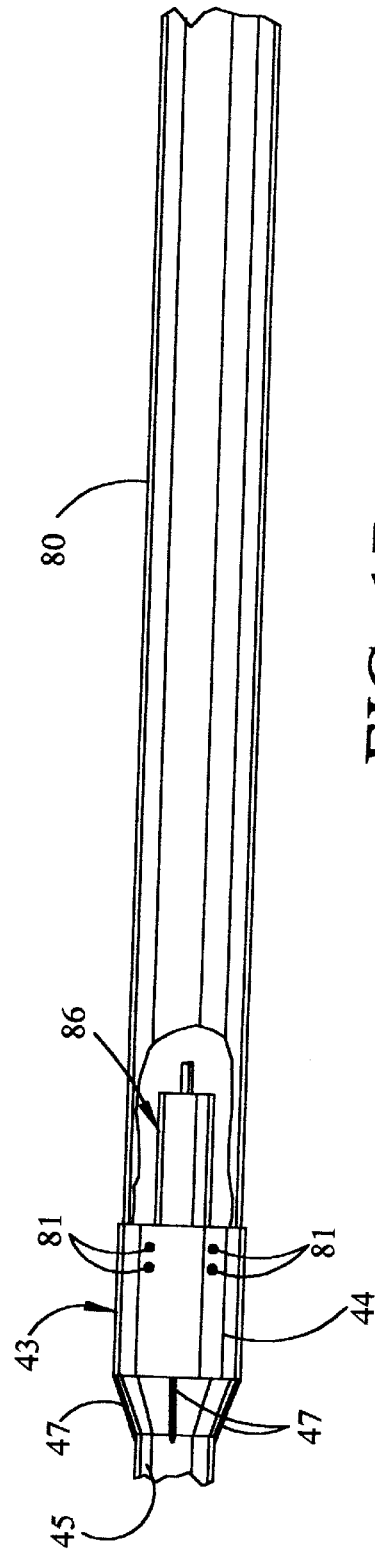
FIG. 17 is a side view, partially in section, of the bursting head and hammer components of the apparatus, more particularly illustrating a replacement pipe removably mounted on the bursting head in typical operation of the apparatus.

Referring again to FIGS. 1, 3, 17 and 23 of the drawings, in typical application of the apparatus 1 of this invention the rod-pulling device 2 is initially situated typically in a manhole or excavation (not illustrated) at one open end of the underground gas, water, sewer or other utility pipe 83 (illustrated in phantom in FIG. 1) to be replaced. The pull rod 57 is extended through the pipe 83 to be replaced, and one end of the pull rod 57 is further extended through the front rod-driving member 11 (FIGS. 6–8) and rear rod-driving member 56 of the rod-pulling device 2, with the pull rod 57 extending through the rod opening 3c at the front end of the housing 3, as illustrated in FIG. 1 and heretofore described, The pipe bursting head 43 is fitted with the stored energy head 60, with the stored energy head rod 64 extending from the nose 62 of the stored energy head 60 and from the nose cap 51 of the bursting head 43. Under circumstances in which pipe valves, concrete encasement, timbers or other obstructions are likely to be encountered by the bursting head 43 in the pipe 83, the pneumatic hammer 86 is mounted on the machined head 72, as heretofore described with respect to FIG. 3. The pull rod 57 is next connected to the stored energy head rod 64 by initially positioning the pipe bursting head 43 and contained stored energy head 60 through a second manhole or excavation (not illustrated), adjacent to the opposite open end of the pipe 83, and threading the rod nipple 58 of the pull rod 57 into the nipple opening 64a of the stored energy head rod 64, as illustrated in FIG. 23. The replacement pipe 80 (grated in phantom) is typically removably screwed or bolted to the expander 44 of the bursting head 43, as heretofore described with respect to FIG. 18. The pull rod 57 is then further extended through the rod-pulling device 2 until the pull rod 57 draws the nose 45 of the bursting head 43 into the pipe 83, and the pipe-cutting blades 47 engage the end of the pipe 83. The rod-pulling device 2 is then operated to continually draw the pull rod 57 rearwardly through the housing 3 of the rod-pulling device 2. Accordingly, this rearward motion of the pull rod 57 and the attached stored energy head rod 64 draws the rod plate 65 and spring plate 67, mounted on the stored energy head rod 64, forwardly in the body interior 61a of the stored energy head 60, thereby compressing the first stored energy spring 68 between the spring plate 67 and stationary nose plate 63, and the second stored energy spring 68a between the rod plate 65 and the spring plate 67. Consequently, the first stored energy spring 68 and second stored energy spring 68a tend to bias the stored energy head 60 forwardly in the nose interior 45a of the burst head 43, by exerting forward pressure against the nose plate 63b This action biases the front surface of the machined head 72 of the stored energy head 60 against the annular shoulder 46 of the bursting head 43. Therefore, due to the pulling action of the stored energy head rod 64 and attached rod plate 65 against the second stored energy spring 68a, and the resulting forward bias of the compressed first stored energy spring 68 and second stored energy spring 68a against the stored energy head 60, the machined head 72 of the stored energy head 60 pushes forwardly against the shoulder 46 of the bursting head 43 , and this action pushes the blades 47 of the bursting head 43 forwardly against the pipe 83 to be replaced. As the blades 47 cut the pipe 83, the tapered wall 48 and the expander 44 of the bursting head 43 are pulled through the weakened, cut portion of the pipe 83, thus forming flared pipe strips 84 at the burst point of the pipe 83 as the bursting head 43 is pulled progressively along the pipe 835 Simultaneously, the replacement pipe 80 is drawn into place behind the pipe bursting head 43, as illustrated in FIG. 17, until the bursting head 43 reaches the opposite end of the pipe 83 at the pulling device 2 and the entire length of the pipe 83 has been bursted and the replacement pipe 80 drawn into place. Under circumstances in which the nose 45 of the bursting head 43 encounters significant obstructions in the pipe 83, the hammer 86 can be operated to repeatedly withdraw the hammer nose 87 from engagement with the her seat 72a of the machined head 72, against compression tension of the hammer spring 77, and strike the hammer seat 72a in rapid succession Each time the hammer nose 87 strikes the hammer seat 72a of the stored energy head 60, the stored energy head 60 and bursting head 43 are transiently driven forwardly with respect to the rod plate 65 and stored energy head rod 64 as the front se of the machined head 72 pushes the bursting head 43 forwardly against the pipe 83 at the shoulder 46. Simultaneously the first stored energy spring 68 and second stored energy spring 68a, normally compressed between the rod plate 65 and nose plate 63 as the stored energy head rod 64 pulls the rod plate 65 forwardly against the second stored energy spring 68a, are released due to the transient increased distance between the nose plate 63 of the stored energy head 60, and the rod plate 65. Consequently, the released fist stored energy spring 68 and second stored energy spring 68a exert transient forward pressure against the nose plate 63 of the stored energy head 60 as the hammer nose 87 strikes the hammer seat 72a, in such a manner that the released first stored energy spring 68 and second stored energy spring 69 augment the driving effect of the machined head 72 against the shoulder 46 of the bursting head 43 and thus act in concert with the hammer 86 to drive the bursting head 43 against the pipe 83. The constant pulling action of the rod-pulling device 2 on the pull rod 57 and attached stored energy head rod 64, combined with the intermittent pushing action of the hammer 86 on the machined head 72 of the stored energy head 60, which is augmented by the first stored energy spring 68 and second stored energy spring 68a, causes the bursting head 43 to progressively cut and bust the pipe 83 and cut through obstructions in the pipe 83 as the bursting head 43 migrates along the pipe 83 and draws the replacement pipe 80 into position Finally, the bursting head 43 is removed from the replacement pipe 80 by unthreading the pipe screws 81 (FIG. 18) and the replacement pipe 80 is connected to the utility piping system (not illustrated) of which the replacement pipe 80 is a part.

Figure 16:
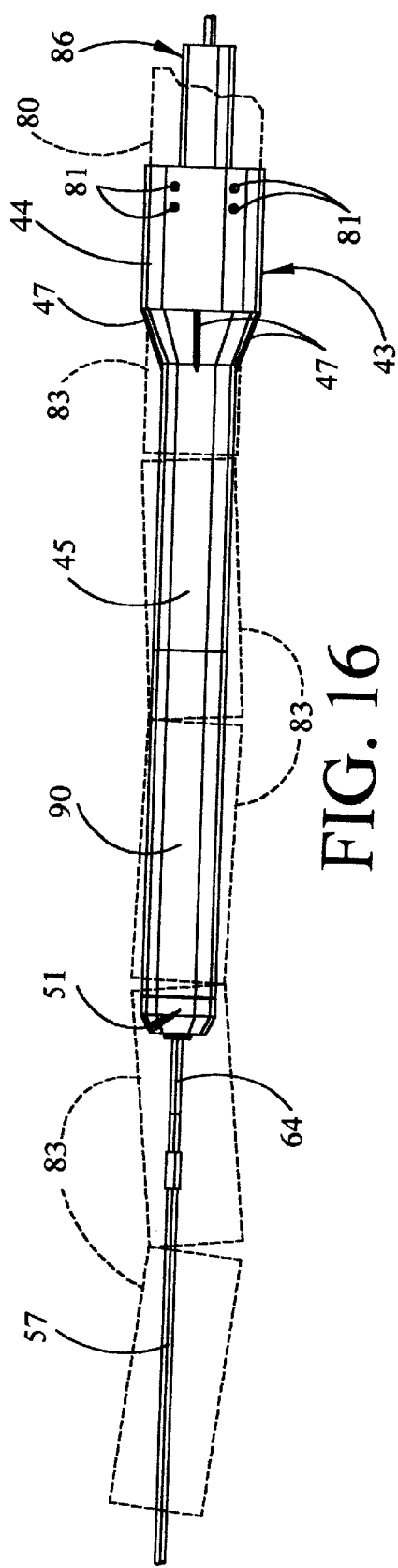
FIG. 16 is a side view, partially in section, of the bursting head illustrated in FIG. 14, more particularly illustrating straightening and bursting of an underground pipe (illustrated in phantom) having a swag or belly in operation of the apparatus, and a replacement pipe (also illustrated in phantom) removably attached to the bursting head.
Figure 18:
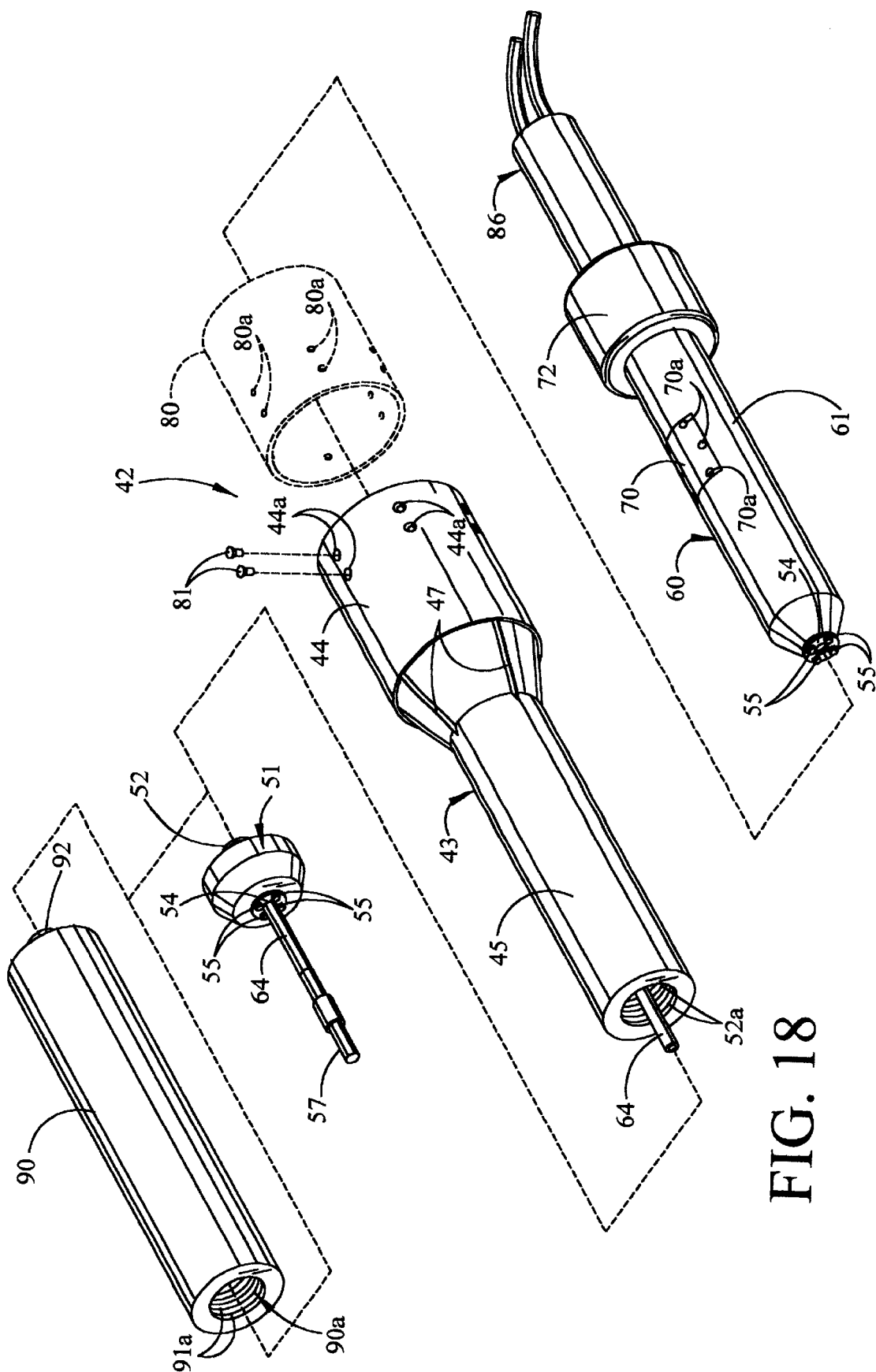
FIG. 18 is an exploded, perspective view, partially in section, of the bursting head illustrated in FIG. 14, more particularly illustrating removable mounting of the nose extension on the bursting head.
Figure 21:
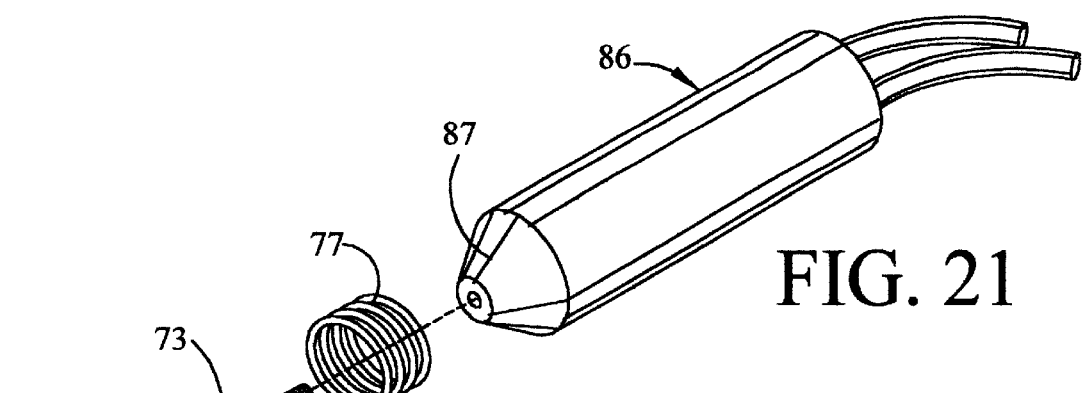
FIG. 21 is a perspective view, partially in section, of a conventional pneumatic hammer, more particularly illustrating in exploded perspective view a preferred technique for mounting the hammer in spring-biased configuration against the stored energy head (not illustrated) of the apparatus.
Figure 26:
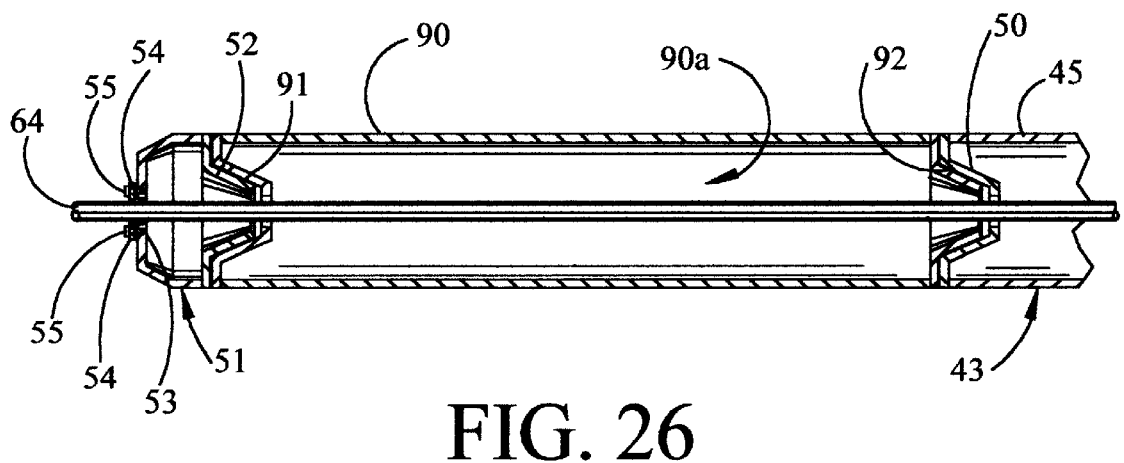
FIG. 26 is a longitudinal sectional view, taken along section lines 26—26 in FIG. 14, of the nose extension component of the bursting head of the apparatus.

Referring again to FIG. 16 and to FIGS. 14, 18 and 26 of the drawings, an elongated nose extension 90 can be attached to the nose 45 of the bursting head 43 and acts as a mandrel for straightening the pipe 83 to be replaced under circumstances in which the pipe 83 has a swag or belly, as illustrated in phantom in FIG. 16. As illustrated in FIG. 26, the nose extension 90 is typically characterized by an extension interior 90a, and a female coupling 91, having a female coupling opening (not illustrated) and provided with female coupling threads 91a, as illustrated in FIG. 18, is fitted in one end of the nose extension 90 A male coupling 92, having a male coupling opening (not illustrated) and provided with made coupling threads (also not illustrated), is provided on the opposite end of the nose extension 90. The nose extension 90 is assembled on the nose 45 of the bursting head 43 by threading the male coupling 92 of the nose extension 90 in the companion female threaded coupling 50 (FIG. 3) of the bursting head 43, and threading the male threaded coupling 52 of the nose cap 51 in the companion female coupling 91 of the nose extension 90. The stored energy head rod 64 extends through the gasket 53 of the nose cap 51, as heretofore described with respect to the bursting head 43 in FIG. 3; and through the male coupling opening (not illustrated) of the male threaded coupling 52, the female coupling opening (not illustrated) of the female coupling 91 of the nose extension 90, the extension interior 90a, the male coupling opening (not illustrated) of the male coupling 92 and registering female coupling opening (not illustrated) of the female treaded coupling 50 of the bursting head 45, and through the gasket 53 provided in the nose 62 of the stored energy head 60, as heretofore described with respect to FIG. 3. Accordingly, by operation of the rod-pulling device 2 (FIG. 1) with or without using the pneumatic hammer 86 (FIG. 3), the bursting head 43 is used to cut and burst the pipe 83 to be replaced as heretofore described with respect to FIG. 3, with the nose extension 90 and nose 45 of the pipe bursting head 43 extending into the pipe 83 to substantially straighten the pipe 83 as the pipe bursting head 43 migrates along the pipe 83. Thus, the nose extension 90 and nose 45 of the pipe-bursting head 43 straighten the swag or belly in the old pipe 83 and maintain the replacement pipe 80 (FIG. 3, attached to the expander 44 of the bursting head 43) on a substantially even grade as the replacement pipe 80 is drawn into position in the pipe burrow.

Figure 24:
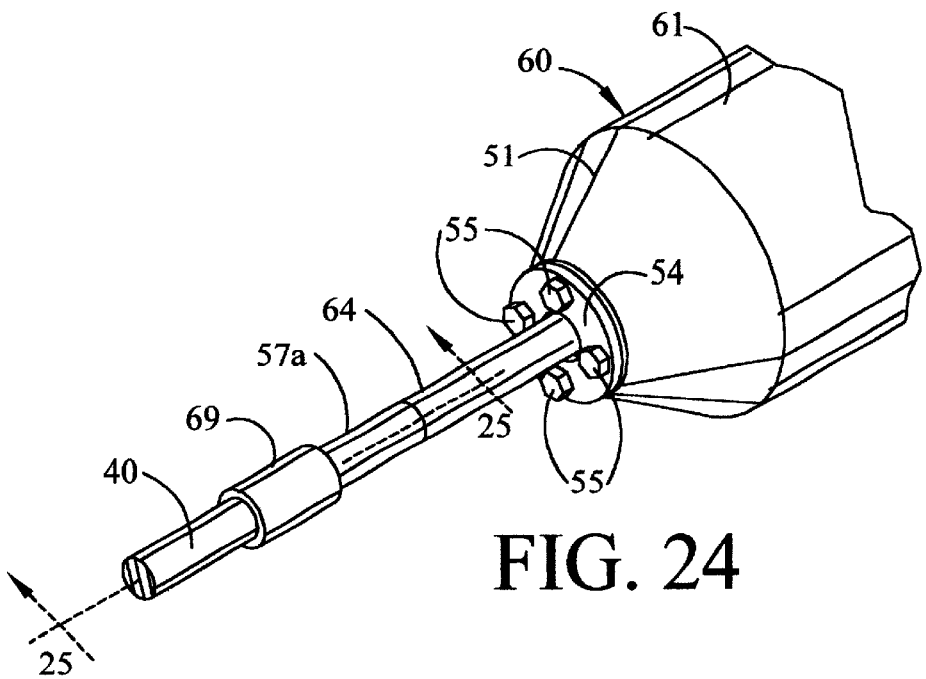
FIG. 24 is a perspective view, partially in section, of the stored energy head, more particularly illustrating attachment of a pull cable to the stored energy head in an alternative application of the apparatus.
Figure 25:
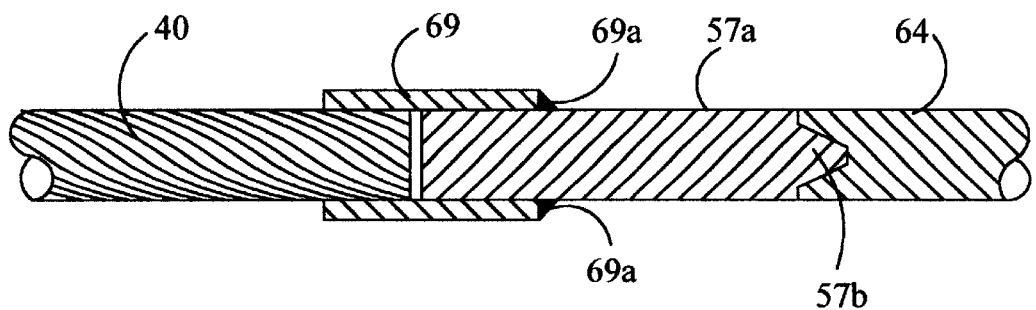
FIG. 25 is a sectional view, taken along section line 25—25 in FIG. 24, of the pull cable and attached pull rod segment and stored energy head rod components of the stored energy head.

Referring next to FIGS. 24 and 25 of the drawings, it will be appreciated by those skilled in the art that a pull cable 40 instead of the pull rod 57 can be used to attach the rod-pulling device 2 (FIG. 1) to the stored energy head rod 64 (FIG. 3). Accordingly, the rod nipple 58 (FIG. 23) of the pull rod 57 is unthreaded from the nipple opening 64a of the stored energy head rod 64, and a threaded rod segment nipple 57b, provided on the end of a rod segment 57a, is threaded in the nipple opening 64a of the stored energy head rod 64, as illustrated in FIG. 25. The pull cable 40, typically wound on a spool 41 (FIG. 2) as heretofore described with respect to the prior art pipe bursting and replacing apparatus 94 illustrated in FIG. 2, is engaged by a conventional, typically hydraulic cable-pulling device (not illustrated) of selected design which is known to those asked in the art. The pull cable 40 is extended through the pipe 83 (FIG. 2) to be replaced and connected to the rod segment 57a typically by means of a ferrule 69, typically welded to the rod segment 57a at a weld 69a, as illustrated in FIG. 25. Accordingly, the conventional hydraulic cable-pulling device is operated to constantly pull the pull cable 40 and the attached stored energy head 60 inside the pipe bursting head 43, as heretofore described with respect to FIG. 3, and can be used with or without the pneumatic hammer 86 to force the pipe bursting head 43 along the pipe 83, as heretofore described.

It will be appreciated by those skilled in the art that the pipe bursting and replacement apparatus of this invention is capable of bursting and replacing underground utility pipes at greater speeds than can be achieved using conventional pipe bursting and replacing apparatuses known to those skilled in the art. The additional propulsion energy imparted to the bursting head by the front and rear stored energy springs, in conjunction with the pneumatic hammer and rod-pulling device, facilitates bursting and replacing obstructed and unobstructed utility pipes with greater speed and efficiency than can be achieved using conventional pipe bursting and replacing systems for the purpose. It will be further appreciated by those skilled in the art that the stored energy head of the apparatus of this invention can be used with various conventional rod or cable-pulling devices known to those skilled in the art to facilitate quicker and more efficient bursting and replacement of underground pipes, and the special design of the stored energy head facilitates the capability of bursting and replacing pipes over longer distances using smaller rod or cable-pulling devices than can typically be achieved using a conventional pipe bursting head referring again to FIG. 3 of the drawings, it is understood that the stored energy head 60 can be constructed in various lengths and diameters for use with bursting heads 43 designed to burst pipes 83 having various diameters. It is understood that while the spring assembly 96 can be constructed using one or any number of springs other than the first stored energy spring 68 and second stored energy spring 68a heretofore described, two springs are preferred for optimum biasing effect of the machined head 72 of the stored energy head 60 against the shoulder 46 of the bursting head 43 as heretofore described. Referring again to FIGS. 23–25 of the drawings, it is understood that the pull rod 57 (FIG. 23) or pull cable 40 (FIGS. 24 and 25) can be connected to the stored energy head rod 64 using any suitable technique known to those skilled in the art, as long as the connection between the pull rod 57 or pull cable 40 and the stored energy head rod 64 is capable of withstanding at least about 200,000 lbs. of pressure exerted on the pull rod 57 by the rod-pulling device 2 (FIG. 1). It will further be appreciated by those skilled in the art that the rod-pulling device of this invention can be used with substantially any type of pipe bursting head known to those skilled in the art to facilitate bursting and replacement of underground pipes. A retrieval cable (not illustrated) can be attached to the pneumatic hammer 86 for retrieval of the bursting head 43, the enclosed stored energy head 60 and the pneumatic hammer 86, under circumstances where the rod-pulling device 2 is unable to pull the bursting components through an obstruction or where the pull rod 57 or pull cable 40 breaks during the pulling operation.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. An apparatus for bursting a pipe, comprising a pipe bursting mechanism for engaging the pipe, a rod engaging said pipe bursting mechanism and a rod-pulling device engaging said rod for pulling said pipe bursting mechanism against the pipe, said rod-pulling device comprising a pair of rod-driving members for alternately engaging, pulling and releasing said rod and a frame for receiving said pair of rod-driving members and wherein said pair of rod-driving members each comprises a hydraulic cylinder carried by said frame, a piston slidably disposed in said hydraulic cylinder and a rod-gripping element carried by said piston for alternately gripping and releasing said rod, whereby said pipe bursting mechanism progressively cuts and bursts the pipe along the length of the pipe as said rod-pulling device pulls said rod and said rod pulls said pipe bursting mechanism against the pipe.

2. The apparatus of claim 1 wherein said pipe bursting mechanism comprises a pipe bursting head for engaging the pipe, a stored energy head engaging said pipe bursting head, and a bias mechanism provided in said stored energy head for engaging said rod and biasing said stored energy head against said pipe bursting head as said rod pulling device pulls said rod against said bias mechanism.

3. The apparatus of claim 2 wherein said rod-pulling device comprises a frame for receiving said pair of rod-driving members and said pair of rod-driving members each comprises a hydraulic cylinder carried by said frame, a piston slidably disposed in said hydraulic cylinder and a rod-gripping element carried by said piston for alternately gripping and releasing said rod.

4. The apparatus of claim 1 comprising a hammer mechanism engaging said pipe bursting mechanism for intermittently driving said pipe bursting mechanism against the pipe.

5. The apparatus of claim 4 wherein said rod-pulling mechanism comprises a fame for receiving said pair of rod-driving members and said pair of rod-driving members each comprises a hydraulic cylinder carried by said frame, a piston slidably disposed in said hydraulic cylinder and a rod-gripping element carried by said piston for alternately gripping and releasing said rod.

6. The apparatus of claim 4 wherein said pipe bursting mechanism comprises a pipe bursting head for engaging the pipe, a stored energy head engaging said pipe bursting head, and a bias mechanism provided in said stored energy head for engaging said rod and biasing said stored energy head against said pipe bursting head as said rod pulling device pulls said rod against said bias mechanism, and wherein sad hammer mechanism engages said stored energy head.

7. The apparatus of claim 6 wherein said rod-pulling device comprises a frame for receiving said pair of rod-driving members and said pair of rod-driving members each comprises a hydraulic cylinder carried by said frame, a piston slidably disposed in said hydraulic cylinder and a rod-gripping element carried by said piston for alternately gripping and releasing said rod.

8. The apparatus of claim 2 comprising a nose plate fitted in said stored energy head for receiving said rod, a rod plate terminating said rod and wherein said bias mechanism comprises at least one stored energy spring interposed between said nose plate and said rod plate.

9. The apparatus of claim 8 wherein said rod-pulling device comprises a frame for receiving said pair of rod-driving members and said pair of rod-driving members each comprises a hydraulic cylinder carried by said frame, a piston slidably disposed in said hydraulic cylinder and a rod-gripping element carried by said piston for alternately gripping and releasing said rod.

10. The apparatus of claim 8 comprising a hammer mechanism carried by said stored energy head for intermittently striking said stored energy head against said pipe bursting head and forcing said pipe bursting head against the pipe.

11. The apparatus of claim 10 wherein said rod-pulling device comprises a frame for receiving said pair of rod-driving members and said pair of rod-driving members each comprises a hydraulic cylinder carried by said frame, a piston slidably disposed in said hydraulic cylinder and a rod-gripping element carried by said piston for alternately gripping and releasing said rod.

12. The apparatus of claim 6 comprising a hammer bias mechanism engaging said hammer mechanism for biasing said hammer mechanism against said stored energy head.

13. The apparatus of claim 12 wherein said rod-pulling device comprises a frame for receiving said pair of rod-driving members and said pair of rod-driving members each comprises a hydraulic cylinder carried by said frame, a piston slidably disposed in said hydraulic cylinder and a rod-gripping element carried by said piston for alternately gripping and releasing said rod.

14. A rod-pulling device for engaging a rod attached to a pipe bursting head and pulling the pipe bursting head against a pipe to facilitate bursting and replacing the pipe, said rod-pulling device comprising a frame and a pair of rod-driving members carried by said frame for alternately engaging, pulling and releasing the rod, each of said pair of rod-driving members comprising a hydraulic cylinder having an interior fluid chamber carried by said frame, a piston slidably disposed in said fluid chamber of said hydraulic cylinder and a rod-gripping element carried by said piston for alternately trapping and releasing said rod, whereby said pipe bursting head progressively cuts and bursts the pipe along the length of the pipe as said pair of rod-driving members pulls said rod and said rod pulls said pipe bursting head against the pipe.

15. The rod-pulling device of claim 14 comprising a tapered wedge slidably disposed in said rod-gripping element for gripping said rod as said piston traverses said fluid chamber of said hydraulic cylinder in a first direction and releasing said rod as said piston traverses said fluid chamber of said hydraulic cylinder in a second direction.

16. The rod-pulling device of claim 14 comprising a front hydraulic fluid port provided in fluid communication with said fluid chamber at one end of said hydraulic cylinder and a rear hydraulic fluid port provided in fluid communication with said fluid chamber at the other end of said hydraulic cylinder for facilitating flow of pressurized hydraulic fluid into and out of said fluid chamber and movement of said piston in a selected direction in said fluid chamber.

17. The rod-pulling device of claim 16 comprising a tapered wedge slidably disposed in said rod-gripping element for gripping said rod as said piston traverses said fluid chamber of said hydraulic cylinder in a first direction and releasing said rod as said piston traverses said fluid chamber of said hydraulic cylinder in a second direction.

18. The rod-pulling device of claim 15 wherein said rod-gripping element comprises a male coupling carried by said piston, an adaptor body engaging said male coupling and a pipe coupling engaging said adaptor body and wherein said tapered wedge is slidably disposed in said adaptor body.

19. The rod-pulling device of claim 18 comprising a front hydraulic fluid port provided in fluid communication with said fluid chamber at one end of said hydraulic cylinder and a rear hydraulic fluid port provided in fluid communication with said fluid chamber at the other end of said hydraulic cylinder for facilitating flow of pressurized hydraulic fluid into and out of said fluid chamber and movement of said piston in a selected direction in said fluid chamber.

20. A pipe-bursting device for attachment to a pulling device and engaging a buried pipe to facilitate bursting the pipe as the pulling device is operated to pull said pipe-bursting device against the pipe, said pipe-bursting device comprising a pipe bursting head for engaging the pipe; a rod for engaging the pulling device; a stored energy head for receiving said rod and engaging said pipe bursting head; and a bias mechanism engaging said rod in said stored energy head for biasing said stored energy head against said pipe bursting head as the pulling device is operated to pull said rod against said bias mechanism, whereby said pipe bursting head exerts bursting pressure against the pipe as said pulling device pulls said rod against said bias mechanism, said bias mechanism exerts pressure against said stored energy head and said stored energy head exerts pressure against said pipe bursting head.

21. The pipe-bursting device of claim 20 comprising a hammer mechanism engaging said stored energy head for repeatedly striking said stored energy head against said pipe bursting head and driving said pipe bursting head against the pipe as said pulling device pulls said rod against said bias mechanism, whereby said bias mechanism augments the driving effect of said hammer mechanism against said stored energy head as said hammer strikes said stored energy head.

22. The pipe-bursting device of claim 20 comprising a nose plate fitted in said stored energy head for receiving said rod and a rod plate terminating said rod inside said stored energy head, and wherein said bias mechanism compresses at least one stored energy spring interposed between said nose plate and said rod plate.

23. The pipe-bursting device of claim 22 comprising a hammer mechanism engaging said stored energy head for repeatedly striking said stored energy head against said pipe bursting head and driving said pipe bursting head against the pipe as said pulling device pulls said rod against said bias mechanism, whereby said bias mechanism augments the driving effect of said hammer mechanism against said stored energy head as said hammer strikes said stored energy head.

24. The pipe-bursting device of claim 21 comprising a machined head provided on said stored energy head for receiving said hammer mechanism and a hammer bias mechanism engaging said hammer mechanism and said machined head for biasing said hammer mechanism against said machined head.

25. The pipe-bursting device of claim 24 comprising a nose plate fitted in said stored energy head for receiving said rod and a rod plate terminating said rod inside said stored energy head, and wherein said bias mechanism comprises at least one stored energy spring interposed between said nose plate and said rod plate.

26. The pipe-bursting device of claim 20 comprising a nose extension fitted on said pipe bursting head for substantially straightening the pipe as said pulling device pulls said pipe bursting head against the pipe.

27. The pipe-bursting device of claim 26 comprising a machined head provided on said stored energy head, a hammer mechanism engaging said machined head for repeatedly string said stored energy head against said pipe bursting head and driving said pipe bursting head against the pipe as said pulling device pulls said rod against said bias mechanism, and a hammer bias mechanism engaging said hammer mechanism and said machined head for biasing said hammer mechanism against said machined head, whereby said bias mechanism augments the driving effect of said hammer mechanism against said stored energy head as said hammer mechanism strikes said stored energy head.

28. The pipe-bursting device of claim 27 comprising a nose plate fitted in said stored energy head for receiving said rod and a rod plate terminating said rod inside said stored energy head and wherein said bias mechanism comprises a pair of stored energy springs interposed between said nose plate and said rod plate.

* * * * *